United States Patent
Shaheen

(10) Patent No.: US 9,602,555 B2
(45) Date of Patent: Mar. 21, 2017

(54) COLLABORATIVE SESSION CONTROL TRANSFER AND INTER-DEVICE TRANSFER IN INTERNET PROTOCOL MULTIMEDIA SUBSYSTEM

(75) Inventor: Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 289 days.

(21) Appl. No.: 12/943,327

(22) Filed: Nov. 10, 2010

(65) Prior Publication Data

US 2011/0110275 A1    May 12, 2011

Related U.S. Application Data

(60) Provisional application No. 61/259,818, filed on Nov. 10, 2009, provisional application No. 61/264,052, filed on Nov. 24, 2009.

(51) Int. Cl.
   *H04L 29/06*   (2006.01)
   *H04M 7/00*   (2006.01)

(52) U.S. Cl.
   CPC ...... *H04L 65/1086* (2013.01); *H04L 65/1089* (2013.01); *H04L 29/06353* (2013.01); *H04L 29/06414* (2013.01); *H04M 7/006* (2013.01)

(58) Field of Classification Search
   CPC ........ H04L 29/06414; H04L 29/06353; H04M 7/006
   USPC .......................... 370/260, 216, 431; 379/242
   See application file for complete search history.

(56) References Cited

U.S. PATENT DOCUMENTS

| | | | |
|---|---|---|---|
| 7,035,657 B2 | 4/2006 | Chen | |
| 7,127,496 B2 | 10/2006 | Isozu | |
| 7,130,282 B2 | 10/2006 | Black | |
| 7,480,721 B2 | 1/2009 | Shaheen | |
| 7,499,719 B2 * | 3/2009 | Rengaraju et al. | 455/518 |

(Continued)

FOREIGN PATENT DOCUMENTS

| | | |
|---|---|---|
| CA | 2605098 | 5/2012 |
| CN | 101015167 | 8/2007 |

(Continued)

OTHER PUBLICATIONS

Third Generation Partnership Project, "Technical Specification Group Services and Architecture; IP Multimedia Subsystem (IMS) Service Continuity; Stage 2 (Release 8)," 3GPP TS 23.237 v8.5.0, Sep. 2009.

(Continued)

*Primary Examiner* — Michael Thier
*Assistant Examiner* — Brian Cox
(74) *Attorney, Agent, or Firm* — Invention Mine LLC

(57) ABSTRACT

Methods and apparatus are disclosed for a wireless transmit/receive unit (WTRU) to request collaborative session control transfer for transferring control of an Internet Protocol (IP) multimedia subsystem (IMS) collaborative session from a controller WTRU to another WTRU, such as a controllee WTRU. The collaborative session control transfer request is sent to an IMS Service Centralization and Continuity Application Server (SCC AS). Methods and apparatus are also disclosed for a WTRU to request inter device transfer (IDT) for transferring an IMS collaborative session media session flow from one WTRU to another WTRU.

8 Claims, 22 Drawing Sheets

(56) References Cited

U.S. PATENT DOCUMENTS

| | | | |
|---|---|---|---|
| 7,667,729 B2 | 2/2010 | Matsumoto | |
| 7,813,748 B2 | 10/2010 | Suzuki | |
| 7,856,226 B2* | 12/2010 | Wong et al. | 455/414.1 |
| 7,945,622 B1 | 5/2011 | Pegg | |
| 8,005,027 B2 | 8/2011 | Ye | |
| 8,077,717 B2* | 12/2011 | Yan et al. | 370/390 |
| 8,078,932 B2 | 12/2011 | Zeira | |
| 8,634,381 B2 | 1/2014 | Mahdi | |
| 8,670,354 B2 | 3/2014 | Lohmar | |
| 2003/0088676 A1 | 5/2003 | Smith | |
| 2003/0145054 A1 | 7/2003 | Van Dyke | |
| 2004/0205653 A1 | 10/2004 | Hadfield | |
| 2004/0230697 A1 | 11/2004 | Kiss | |
| 2005/0091380 A1 | 4/2005 | Gonen | |
| 2005/0141456 A1 | 6/2005 | Shaheen | |
| 2006/0268781 A1 | 11/2006 | Svensson | |
| 2007/0285205 A1 | 12/2007 | Matsumoto | |
| 2008/0119165 A1* | 5/2008 | Mittal et al. | 455/411 |
| 2008/0268847 A1 | 10/2008 | Mukherjee | |
| 2009/0052651 A1 | 2/2009 | Iwakawa | |
| 2009/0073938 A1 | 3/2009 | Zhu | |
| 2009/0086742 A1 | 4/2009 | Ghai | |
| 2009/0103495 A1 | 4/2009 | Shaheen | |
| 2009/0190573 A1 | 7/2009 | Siegel | |
| 2009/0191869 A1 | 7/2009 | Siegel | |
| 2009/0313378 A1* | 12/2009 | Mahdi et al. | 709/227 |
| 2009/0319691 A1 | 12/2009 | Buckley | |
| 2010/0034168 A1* | 2/2010 | Mahdi | 370/331 |
| 2010/0036958 A1 | 2/2010 | Mahdi | |
| 2010/0069101 A1 | 3/2010 | Mahdi | |
| 2010/0082810 A1* | 4/2010 | Patel | H04W 36/24 709/225 |
| 2010/0279670 A1* | 11/2010 | Ghai et al. | 455/414.3 |
| 2010/0287406 A1 | 11/2010 | Ishii | |
| 2010/0312832 A1 | 12/2010 | Allen | |
| 2010/0312841 A1* | 12/2010 | Doken et al. | 709/206 |
| 2010/0312897 A1 | 12/2010 | Allen et al. | |
| 2011/0040836 A1* | 2/2011 | Allen et al. | 709/205 |
| 2011/0110275 A1* | 5/2011 | Shaheen | 370/260 |
| 2011/0161508 A1 | 6/2011 | Kim | |
| 2011/0209188 A1 | 8/2011 | Petersson | |
| 2011/0238845 A1* | 9/2011 | Keller et al. | 709/227 |
| 2012/0011257 A1* | 1/2012 | Kim et al. | 709/227 |
| 2012/0115483 A1* | 5/2012 | Noldus et al. | 455/436 |

FOREIGN PATENT DOCUMENTS

| | | |
|---|---|---|
| CN | 101364874 A | 2/2009 |
| CN | 101383765 | 3/2009 |
| EP | 1819092 | 8/2007 |
| EP | 1848163 | 10/2007 |
| EP | 1909451 A1 | 4/2008 |
| EP | 2061212 | 5/2009 |
| EP | 2073479 A1 | 6/2009 |
| EP | 2083547 | 7/2009 |
| EP | 2093968 A1 | 8/2009 |
| EP | 2239893 A1 * | 10/2010 |
| EP | 2257104 | 12/2010 |
| EP | 2528407 A1 | 11/2012 |
| JP | 10242962 A2 | 9/1998 |
| JP | 2007104163 | 4/2007 |
| JP | 2008067083 | 3/2008 |
| JP | 2008078935 | 4/2008 |
| JP | 2008092579 | 4/2008 |
| JP | 2008148169 | 6/2008 |
| JP | 2009164841 | 7/2009 |
| WO | 2006006897 | 1/2006 |
| WO | 2006075677 | 7/2006 |
| WO | 2007142866 | 12/2007 |
| WO | 2008038200 A2 | 4/2008 |
| WO | 2008072660 | 6/2008 |
| WO | 2009013405 | 1/2009 |
| WO | 2009021549 | 2/2009 |
| WO | 2009088814 | 7/2009 |
| WO | 2009122241 | 10/2009 |
| WO | 2009124943 A1 | 10/2009 |
| WO | 2009134051 | 11/2009 |
| WO | 2010031351 | 3/2010 |
| WO | 2010132820 | 11/2010 |

OTHER PUBLICATIONS

Third Generation Partnership Project, "Technical Specification Group Services and Architecture; IP Multimedia Subsystem (IMS) Service Continuity; Stage 2 (Release 8)," 3GPP TS 23.237 v8.7.0, Mar. 2010.

Third Generation Partnership Project, "Technical Specification Group Services and Architecture; IP Multimedia Subsystem (IMS) Service Continuity; Stage 2 (Release 9)," 3GPP TS 23.237 v9.2.0, Sep. 2009.

Third Generation Partnership Project, "Technical Specification Group Services and Architecture; IP Multimedia Subsystem (IMS) Service Continuity; Stage 2 (Release 9)," 3GPP TS 23.237 v9.6.0, Sep. 2010.

Third Generation Partnership Project, "Technical Specification Group Services and Architecture; IP Multimedia Subsystem (IMS) Service Continuity; Stage 2 (Release 10)," 3GPP TS 23.237 v10.3.0, Sep. 2010.

Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v10.0.0, Sep. 2010.

Ericsson, "Allowing any UE to request the Controller UE to initiate media flow transfer and/or Collaborative Session Control transfer," 3GPP TSG SA WG2 Meeting #72, TD S2-092246 (Mar. 30-Apr. 3, 2009).

Third Generation Partnership Project, "Technical Specification Group Services and System Aspects; IP Multimedia Subsystem (IMS) service continuity enhancements; Service, policy and interaction; Stage 2 (Release 9)," 3GPP TR 23.838 V9.0.0 (Jun. 2009).

Ericsson, "SCC AS providing Controller UE with information about Collaborative Session changes done by Controllee UE," 3GPP TSG SA WG2 Meeting #72, S2-092803 (Mar. 30-Apr. 3, 2009).

Ericsson, "SCC AS providing Controller UE with information about Collaborative Session changes done by Controllee UE," 3GPP TSG SA WG2 Meeting #72, S2-092245 (Mar. 30-Apr. 3, 2009).

Starent Networks, "Controller Initiated Release collaborative session," 3GPP TSG SA WG2 Meeting #72, S2-091849 (Mar. 30-Apr. 3, 2009).

Johnston et al., "Session Initiation Protocol Services Examples," Sipping Working Group, Inter-Draft, draft-ietf-sipping-services-examples-13 (Jul. 16, 2007).

Nokia et al., "Clarify determining the capabilities of an UE to act as Controller/Controllee UE," 3GPP TSG SA WG2 Meeting #72, S2-091958 (Mar. 30-Apr. 3, 2009).

Notification of International Search Report and the Written Opinion and ISR and WO for PCT/US2011/020856, dated Apr. 20, 2011, 12 pages.

Notification of Transmittal of the International Preliminary Report on Patentability for PCT/US2010/056734 dated Feb. 29, 2012, 18 pages.

Notification of Transmittal of the International Preliminary Report on Patentability for PCT/US2010/061881 dated Mar. 29, 2012, 19 pages.

Third Generation Partnership Project, 'Technical Specification Group Services and Architecture; IP Multimedia Subsystem (IMS) Service Continuity; Stage 2 (Release 8),' 3GPP TS 23.237 v8.3.0, (Mar. 2009).

Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v0.1.0, Nov. 2009.

Third Generation Partnership Project, "Technical Specification Group Services and System Aspects; IP Multimedia Subsystem (IMS) Service Continuity; Stage 2 (Release 10)," 3GPP TS 23.237 V10.4.0 (Dec. 2010).

(56) References Cited

OTHER PUBLICATIONS

Written Opinion of the International Preliminary Examining Authority for PCT/US2010/061881 dated Nov. 25, 2011, 11 pages.
"3rd Generation Partnership Project; Technical Specification Group Services and Architecture; IP Multimedia Subsystem (IMS) Service Continuity Enhancements; Service Policy and interaction; Stage 2 (Release 9)", 3GPP Standard; 3GPP TS 23.838, 3rd Generation Partnership Project (3GPP), Mobile Competence Centre; 650, Route Des Lucioles; F-06921 Sophia-Antipolis Cedex; France, No. V1.1.0, Apr. 1, 2009.
"3rd Generation Partnership Project; Technical Specification Group Services and System Aspects; IP Multimedia Subsystem (IMS) Service Continuity; Inter-UE Transfer enhancements; Stage 2 (Release 10)", 3GPP Standard; 3GPP TR 23.831, 3rd Generation Partnership Project (3GPP), Mobile Competence Centre ; 650, Route Des Lucioles ; F-06921 Sophia-Antipolis Cedex ; France, No. V0.2.1, Feb. 12, 2010.
Abstract for Chinese Publication, CN 101015167. Publication date Aug. 8, 2007.
Abstract for Chinese Publication, CN 101364874A. Publication date Feb. 11, 2009.
Abstract for IS2000A7, dated Nov. 2, 1971.
Bertrand, "The IP Multimedia Subsystem in Next Generation Networks," May 30, 2007. http://www.tele.pw.edu.pl/~mareks/auims/IMS_an_overview-1.pdf.
Handley et al., "SIP: Session Initiation Protocol," Internet Engineering Task Force, Request for Comment 2543, Mar. 1999.
Handley et al. (RFC 4566 'SDP: Session Description Protocol', Network Working Group, University of Glasgow, Jul. 2006).
Hutton et al., "An Architecture for Media Recording Using the Session Initiation Protocol," Internet Engineering Task Force, Feb. 2010.
Imai et al., "Duplicate a SIP Session," Internet Engineering Task Force, Dec. 2007.
Levin et al., "Conveying Feature Tags with the Session Initiation Protocol (SIP) Refer Method," Internet Engineering Task Force, Request for Comment 4508, May 2006.
Panasonic et al., 'DHCP Discovery of ANDSF for UE While Roaming,' C1-101234,3GPP TSG-CT WG1 Meeting #63, San Francisco, California, USA, Feb. 22-26, 2010.
QUALCOMM Europe, 'Discussion on How to Initiate Inter-UE Transfer Operation,' C1-092464,3GPP TSG CT WG1 Meeting #59, Los Angeles, California, USA, Jun. 22-26, 2009.
Rehor et al., "Requirements for SIP-Based Media Recording (SIPREC)," Internet Engineering Task Force, Mar. 2010.
Research in Motion, "Addition of Media Feature Tag for Indicating IUT Controller Capability," C1-1012513GPP, TSG-CT WG1 Meeting #63, San Francisco, California, USA, Feb. 22-26, 2010.
Rosenberg et al., "Caller Preferences for the Session Initiation Protocol (SIP)," Internet Engineering Task Force, Request for Comment 3841, Aug. 2004.
Rosenberg et al., "SIP: Session Initiation Protocol," Internet Engineering Task Force, Request for Comment 3261, Jun. 2002.
Third Generation Partnership Project, 'Technical Specification Group Core Network and Terminals; IP Multimedia (IM) Core Network (CN) Subsystem Inter-UE Transfer Enhancements; Stage 3 (Release 10),' 3GPP TR 24.837 v1.1.0, Feb. 2011.
Third Generation Partnership Project, 'Technical Specification Group Core Network and Terminals; IP Multimedia Call Control Protocol Based on Session Initiation Protocol (SIP) and Session Description Protocol (SDP); Stage 3 (Release 10),' 3GPP TS 24.229 vl0.2.0, Dec. 2010.
Third Generation Partnership Project, 'Technical Specification Group Services and Architecture; IP Multimedia Subsystem (IMS) Service Continuity; Stage 2 (Release 10),' 3GPP TS 23.237 V10.0.0 (Dec. 2009).
Third Generation Partnership Project, 'Technical Specification Group Services and Architecture; IP Multimedia Subsystem (IMS) Service Continuity; Stage 2 (Release 8),' 3GPP TS 23.237 v8.6.0, Dec. 2009.
Third Generation Partnership Project, 'Technical Specification Group Services and Architecture; IP Multimedia Subsystem (IMS) Service Continuity; Stage 2 (Release 9),' 3GPP TS 23.237 v9.3.0, Dec. 2009.
Third Generation Partnership Project, 'Technical Specification Group Services and Aspects; IP Multimedia Subsystem (IMS) Service Continuity; Stage 2 (Release 10),' 3GPP TS 23.237 v10.4.1, Jan. 2011.
Third Generation Partnership Project, 'Technical Specification Group Services and System Aspects; IP Multimedia Subsystem (IMS) Centralized Services; Stage 2 (Release 8),' 3GPP TS 23.292 v8.6.0, Dec. 2009.
Third Generation Partnership Project, 'Technical Specification Group Services and System Aspects; IP Multimedia Subsystem (IMS) Centralized Services; Stage 2 (Release 8),' 3GPP TS 23.292 v8.8.0, Jun. 2010.
Third Generation Partnership Project, 'Technical Specification Group Services and System Aspects; IP Multimedia Subsystem (IMS) Centralized Services; Stage 2 (Release 9),' 3GPP TS 23.292 v9.7.0, Sep. 2010.
Third Generation Partnership Project, 'Technical Specification Group Services and System Aspects; IP Multimedia Subsystem (IMS) Service Continuity; Stage 2 (Release 9),' 3GPP TS 23.237 V9.7.0 (Dec. 2010).
Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 1.2.0 (Mar. 2011).
Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v0.3.0, Mar. 2010.
Third Generation Partnership Project, Technical Specification Group Services and System Aspects; IP Multimedia Subsystem (IMS) Centralized Services; Stage 2 (Release 10), 3GPP TS 23.292 v10.2.0, Sep. 2010.
Third Generation Partnership Project, Technical Specification Group Services and System Aspects; IP Multimedia Subsystem (IMS) Centralized Services; Stage 2 (Release 9), 3GPP TS 23.292 v9.4.0, Dec. 2009.
Third Generation Partnership Project, Technical Specification Group Services and System Aspects; IP Multimedia Subsystem (IMS) Service Continuity; Inter-UE Transfer Enhancements; Stage 2 (Release 10), 3GPPTR 23.831 v0.2.1, Feb. 2010.
English Translation of foreign patent publication CN 101364874 A, published on Feb. 11, 2009.
Ericsson, "Allowing any UE to request the Controller UE to initiate media flow transfer and/or Collaborative Session Control transfer," 3GPP TSG SA WG2 Meeting #72, TD S2-092246 (Apr. 3, 2009).
Ericsson, "SCC AS providing Controller UE with information about Collaborative Session changes done by Controllee UE," 3GPP TSG SA WG2 Meeting #72, TD S2-092245 (Apr. 3, 2009).

* cited by examiner

COLLABORATIVE SESSION CONTROL TRANSFER AND INTER-DEVICE TRANSFER IN INTERNET PROTOCOL MULTIMEDIA SUBSYSTEM

CROSS REFERENCE TO RELATED APPLICATIONS

This application claims the benefit of U.S. provisional application No. 61/259,818, filed on Nov. 10, 2009; and U.S. provisional application No. 61/264,052, filed on Nov. 24, 2009, the contents of which are hereby incorporated by reference herein.

FIELD OF INVENTION

This application is related to wireless communications.

BACKGROUND

As wireless communications evolve, wireless technology allows for increasing functionality and capabilities. One capability is the ability to hold Internet Protocol (IP) multimedia subsystem (IMS) sessions. IMS is an architectural framework for delivering IP-based multimedia services. A wireless transmit/receive unit (WTRU) may connect to an IMS through various access networks, including but not limited to networks based on technology such as Universal Mobile Telecommunications System (UMTS) Terrestrial Radio Access Network (UTRAN), Long Term Evolution (LTE), Worldwide Interoperability for Microwave Access (WiMax), or Wireless Local Area Network (WLAN) technology. A WTRU may access the IMS through a packet-switched (PS) domain. Through the use of IMS Centralized Services (ICS), a WTRU may additionally access IMS services via a circuit-switched (CS) domain.

Further, through the use of IMS sessions a WTRU is capable of holding media sessions with a remote party. Examples of these media sessions include audio, video or text sessions. Multiple WTRUs may also participate in a collaborative media session or sessions with a remote party through use of IMS.

SUMMARY

Methods and apparatus are disclosed for a wireless transmit/receive unit (WTRU) to request transferring the control of an Internet Protocol (IP) multimedia subsystem (IMS) collaborative session from a controller WTRU to another WTRU. In the methods and apparatus, a collaborative session control transfer request is sent to an IMS Service Centralization and Continuity Application Server (SCC AS). Session Initiation Protocol (SIP) messaging may be used for communication in the disclosed methods and apparatus. Methods and apparatus are also disclosed for a WTRU to request inter device transfer (IDT) for transferring an IMS media session flow from one WTRU to another WTRU.

BRIEF DESCRIPTION OF THE DRAWINGS

A more detailed understanding may be had from the following description, given by way of example in conjunction with the accompanying drawings wherein.

DETAILED DESCRIPTION

Figure 1A:
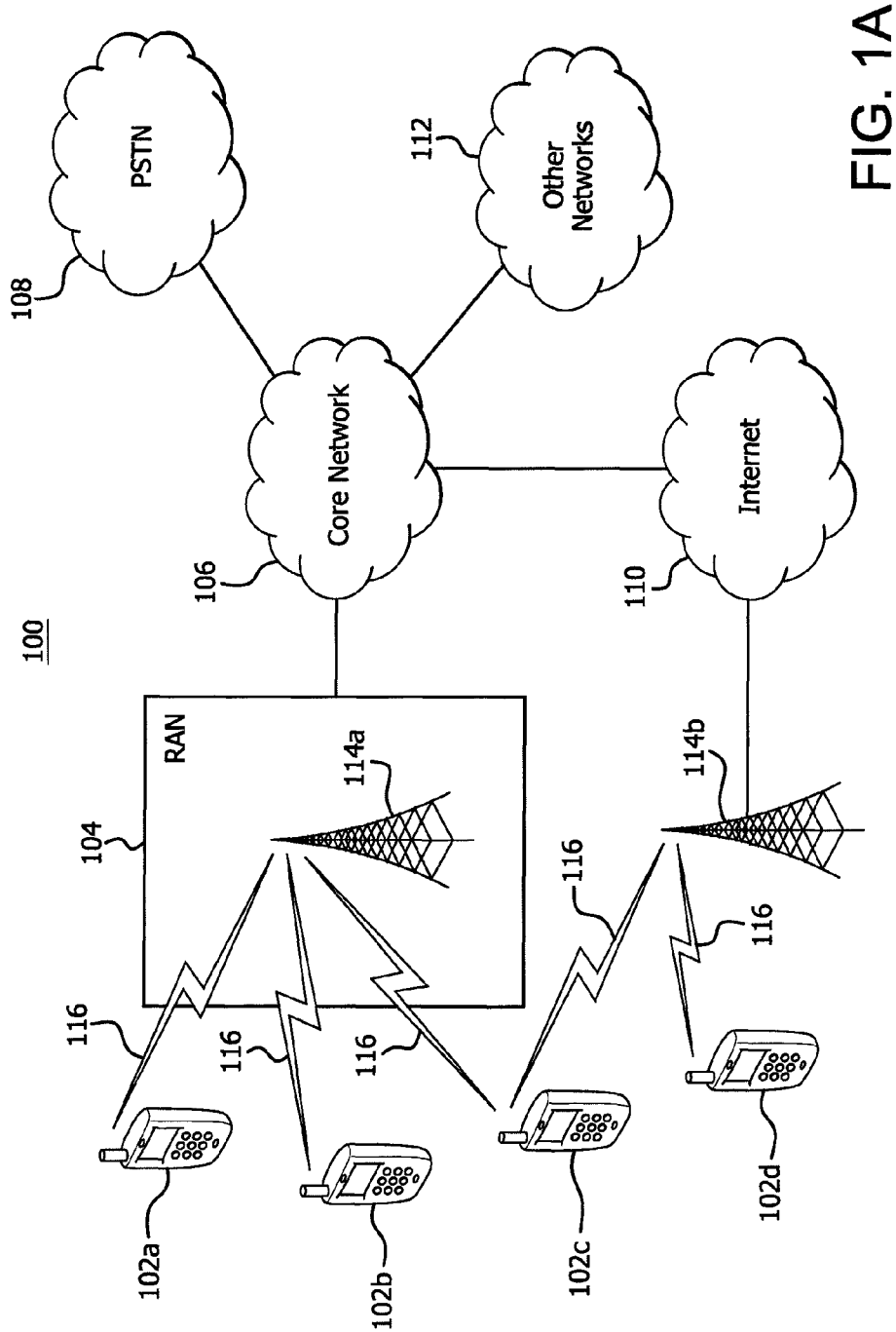
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA. (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
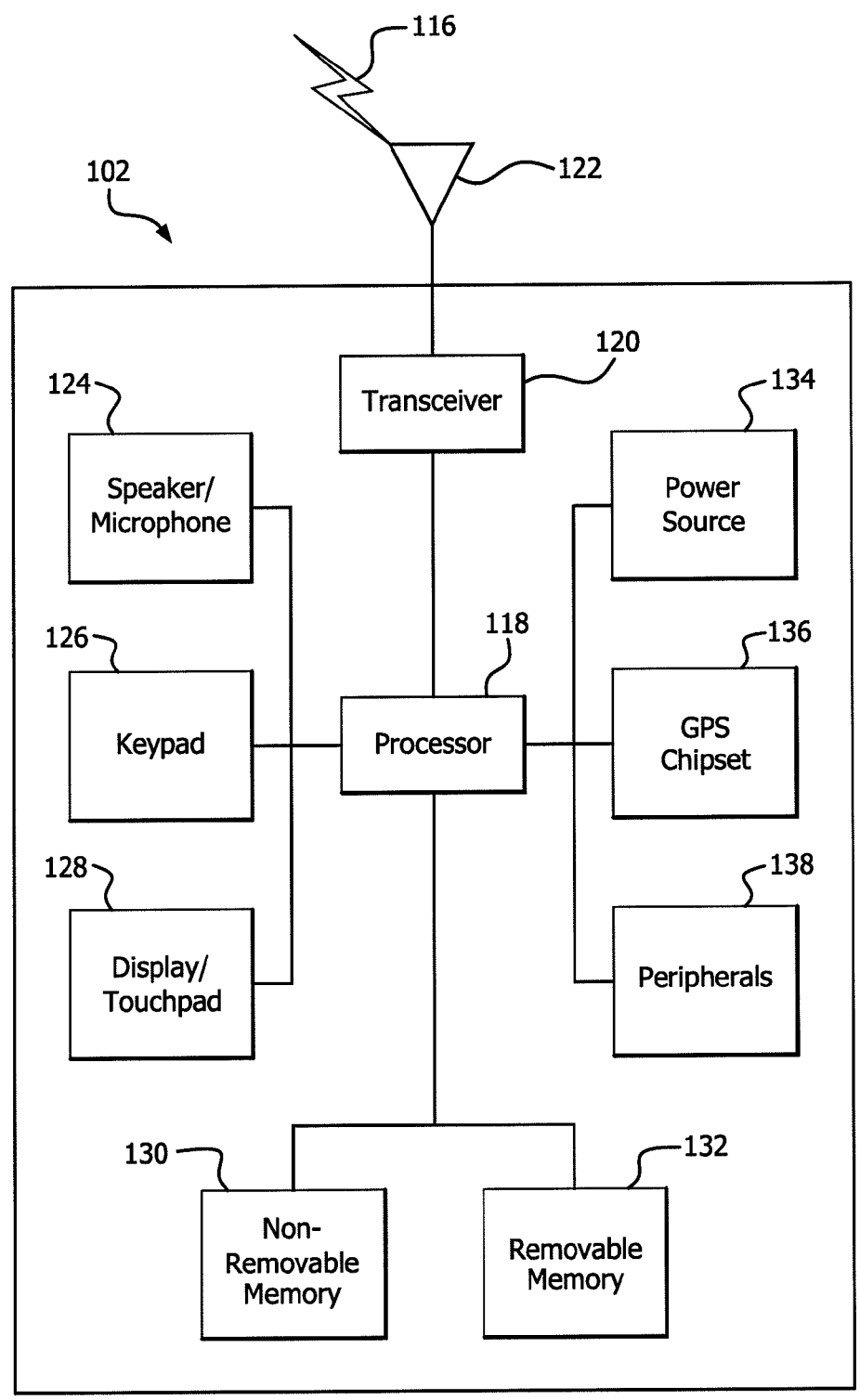
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
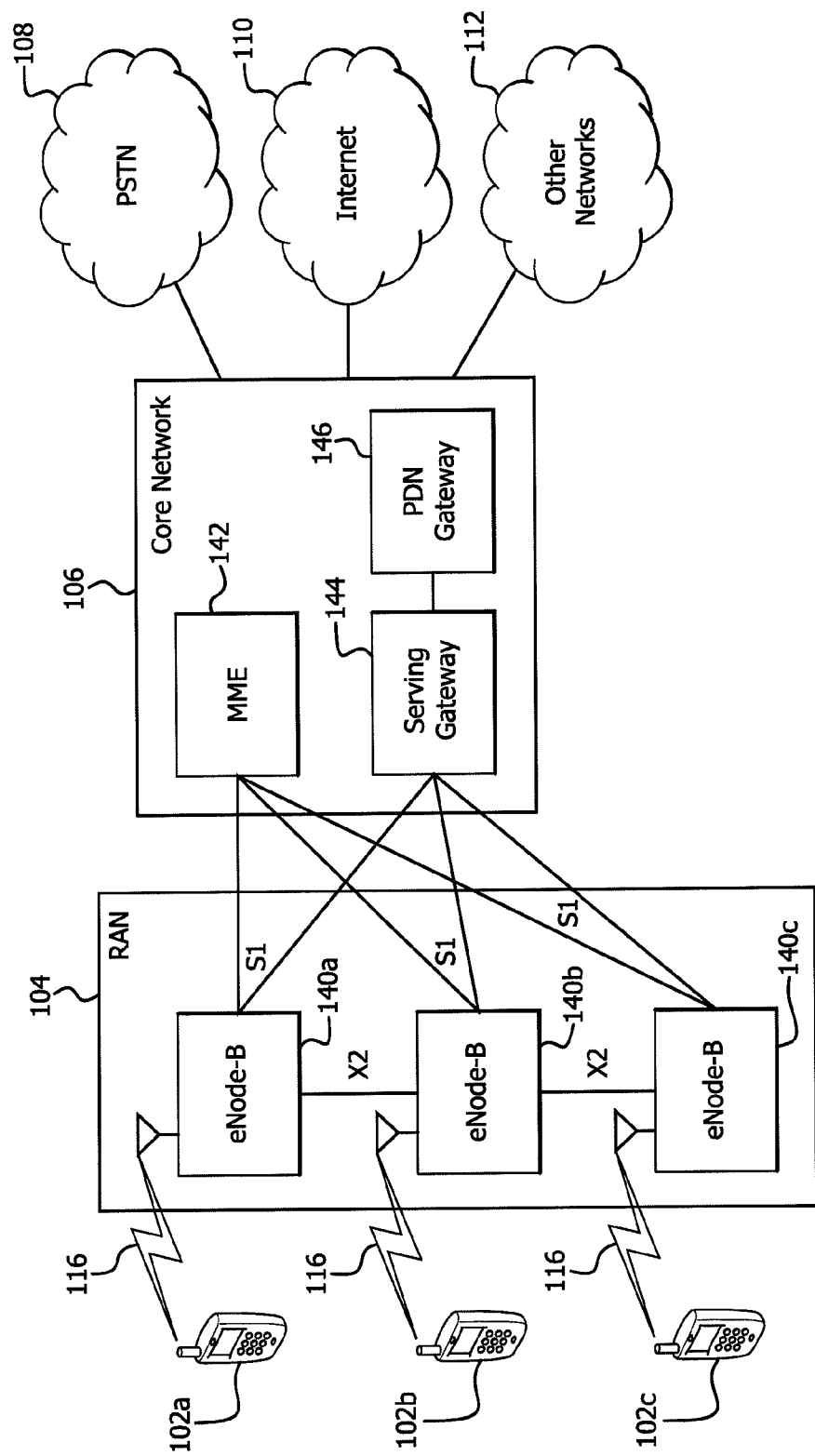
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the other networks 112, which may include other wired or wireless networks that are owned and/or operated by other service providers.

Wireless communication may include using an IP Multimedia (IM) Subsystem (IMS). For example, in LTE, as shown in FIG. 1C, or any other RAN/Core network, the other networks 112 may include IMS. A communication session using IMS may be transferred, or duplicated, from one WTRU to another.

Figure 2:
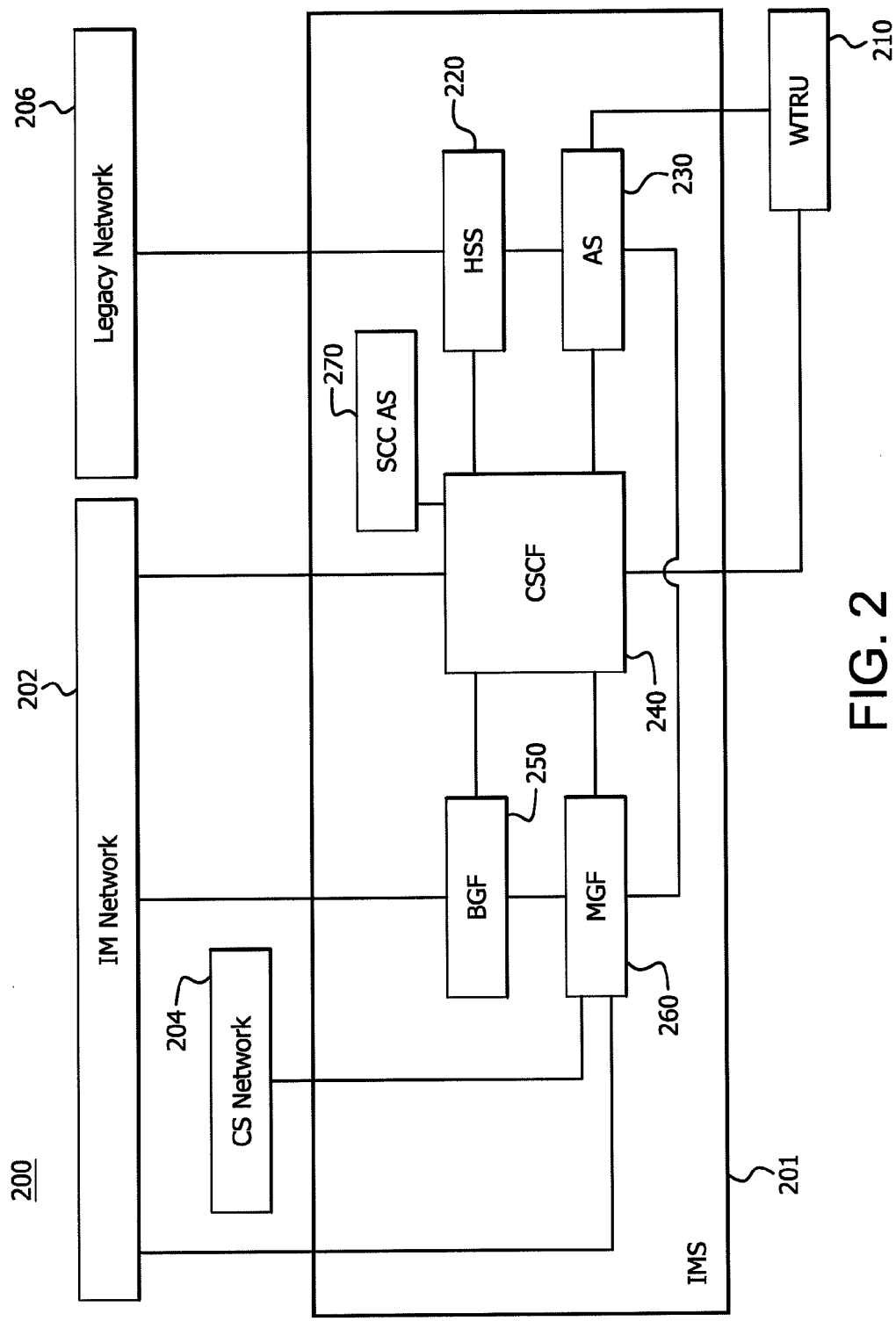
FIG. 2 shows a diagram of an example of an Internet Protocol Multimedia Subsystem.

FIG. 2 is a diagram of an example of a Internet Protocol (IP) IP multimedia core network (IM CN), including an IP Multimedia (IM) Subsystem (IMS) 201, an IM network 202, a Circuit Switched (CS) network 204, a legacy network 206, in communication with a wireless transmit/receive unit (WTRU) 210. The IMS 201 includes core network (CN) elements for provision of IM services, such as audio, video, text, chat, or a combination thereof, delivered over the packet switched domain. As shown, the IMS 201 includes a Home Subscriber Server (HSS) 220, an Application Server (AS) 230, a Call Session Control Function (CSCF) 240, a Breakout Gateway Function (BGF) 250, a Media Gateway Function (MGF) 260, and a Service Centralization and Continuity Application Server (SCC AS) 270. In addition to the logical entities and signal paths shown in FIG. 2, an IMS may include any other configuration of logical entities which may be located in one or more physical devices. Although not shown in this logical example, the WTRU may be a separate physical unit and may be connected to the IM CN via a base station such as, a Node-B or an enhanced-NodeB (eNB).

The WTRU 210 may be any type of device configured to operate and/or communicate in a wired and/or wireless environment.

The HSS 220 may maintain and provide subscription-related information to support the network entities handling IM sessions. For example, the HSS may include identification information, security information, location information, and profile information for IMS users.

The AS 230, which may be a SIP Application Server, an OSA Application Server, or a CAMEL IM-SSF, may provide value added IM services and may reside in a home network or in a third party location. The AS may be included in a network, such as a home network, a core network, or a standalone AS network. The AS may provide IM services. For example, the AS may perform the functions of a terminating user agent (UA), a redirect server, an originating UA, a SIP proxy, or a third party call control.

The CSCF 240 may include a Proxy CSCF (P-CSCF), a Serving CSCF (S-CSCF), an Emergency CSCF (E-CSCF), or an Interrogating CSCF (I-CSCF). For example, a P-CSCF may provide a first contact point for the WTRU within the IMS, a S-CSCF may handle session states, and a I-CSCF may provide a contact point within an operator's network for IMS connections destined to a subscriber of that network operator, or to a roaming subscriber currently located within that network operator's service area.

The BGF 250 may include an Interconnection Border Control Function (IBCF), a Breakout Gateway Control Function (BGCF), or a Transition Gateway (TrGW). Although described as a part of the BGF, the IBCF, the BGCF, or the TrGW may each represent a distinct logical entity and may be located in one or more physical entities.

The IBCF may provide application specific functions at the SIP/SDP protocol layer to perform interconnection between operator domains. For example, the IBCF may enable communication between SIP applications, network topology hiding, controlling transport plane functions, screening of SIP signaling information, selecting the appropriate signaling interconnect, and generation of charging data records.

The BGCF may determine routing of IMS messages, such as SIP messages. This determination may be based on information received in the signaling protocol, administrative information, or database access. For example, for PSTN/CS Domain terminations, the BGCF may determine the network in which PSTN/CS Domain breakout is to occur and may select a MGCF.

The TrGW, may be located on the media path, may be controlled by an IBCF, and may provide network address and port translation, and protocol translation.

The MGF 260 may include a Media Gateway Control Function (MGCF), a Multimedia Resource Function Controller (MRFC), a Multimedia Resource Function Processor (MRFP), an IP Multimedia Subsystem-Media Gateway Function (IMS-MGW), or a Media Resource Broker (MRB). Although described as a part of the MGF, the MGCF, the MRFC, the MRFP, the IMS MGW, or the MRB may each represent a distinct logical entity and may be located in one or more physical entities.

The MGCF may control call state connection control for media channels in IMS; may communicate with CSCF, BGCF, and circuit switched network entities; may determine routing for incoming calls from legacy networks; may perform protocol conversion between ISUP/TCAP and the IM subsystem call control protocols; and may forward out of band information received in MGCF to CSCF/IMS-MGW.

The MRFC and MRFP may control media stream resources. The MRFC and MRFP may mix incoming media streams; may source media streams, for example for multimedia announcements; may process media streams, such as by performing audio transcoding, or media analysis; and may provide floor control, such as by managing access rights to shared resources, for example, in a conferencing environment.

The IMS-MGW may terminate bearer channels from a switched circuit network and media streams from a packet network, such as RTP streams in an IP network. The IMS-MGW may support media conversion, bearer control and payload processing, such as, codec, echo canceller, or conference bridge. The IMS-MGW may interact with the MGCF for resource control; manage resources, such an echo canceller; may include a codec. The IMS-MGW may include resources for supporting UMTS/GSM transport media.

The MRB may support the sharing of a pool of heterogeneous MRF resources by multiple heterogeneous applications. The MRB may assign, or releases, specific MRF resources to a call as requested by a consuming application, based on, for example, a specified MRF attribute. For example, when assigning MRF resources to an application, the MRB may evaluate the specific characteristics of the media resources required for the call or calls; the identity of the application; rules for allocating MRF resources across different applications; per-application or per-subscriber SLA or QoS criteria; or capacity models of particular MRF resources.

The SCC AS 270 may provide communication session service continuity, such as duplication, transfer, addition, or deletion of communication sessions, among multiple WTRUs, for example, in a subscription. The SCC AS may perform Access Transfer, Session Transfer or Duplication, Terminating Access Domain Selection (T-ADS), and Handling of multiple media flows. The SCC AS may combine or split media flows over one or more Access Networks. For example, a media flow may be split or combined for Session Transfers, session termination, upon request by the WTRU to add media flows over an additional Access Network during the setup of a session, or upon request by the WTRU to add or delete media flows over one or more Access Networks to an existing sessions.

A communication session may be performed using a communication system, such as the communication system shown in FIG. 1A, between a WTRU, such as the WTRU shown in FIG. 1B, and a remote device. The WTRU may access the communication system via a RAN, such as the RAN shown in FIG. 1C, or any other wired or wireless access network. The communication session may include services, such as IP multimedia (IM) services provided by the IMS as shown in FIG. 2.

The WTRU, the remote device, or the network may control the communication session. Control of the communication session may include, for example, starting or stopping a media flow, adding or removing a media flow, transferring or duplicating a media flow on another WTRU, adjusting a bit-rate, or terminating the communication. For example, a WTRU may initiate a communication session with a remote device. The WTRU may initially control the communication session. The WTRU may pass or share control of the communication session with the remote device.

Figure 3:
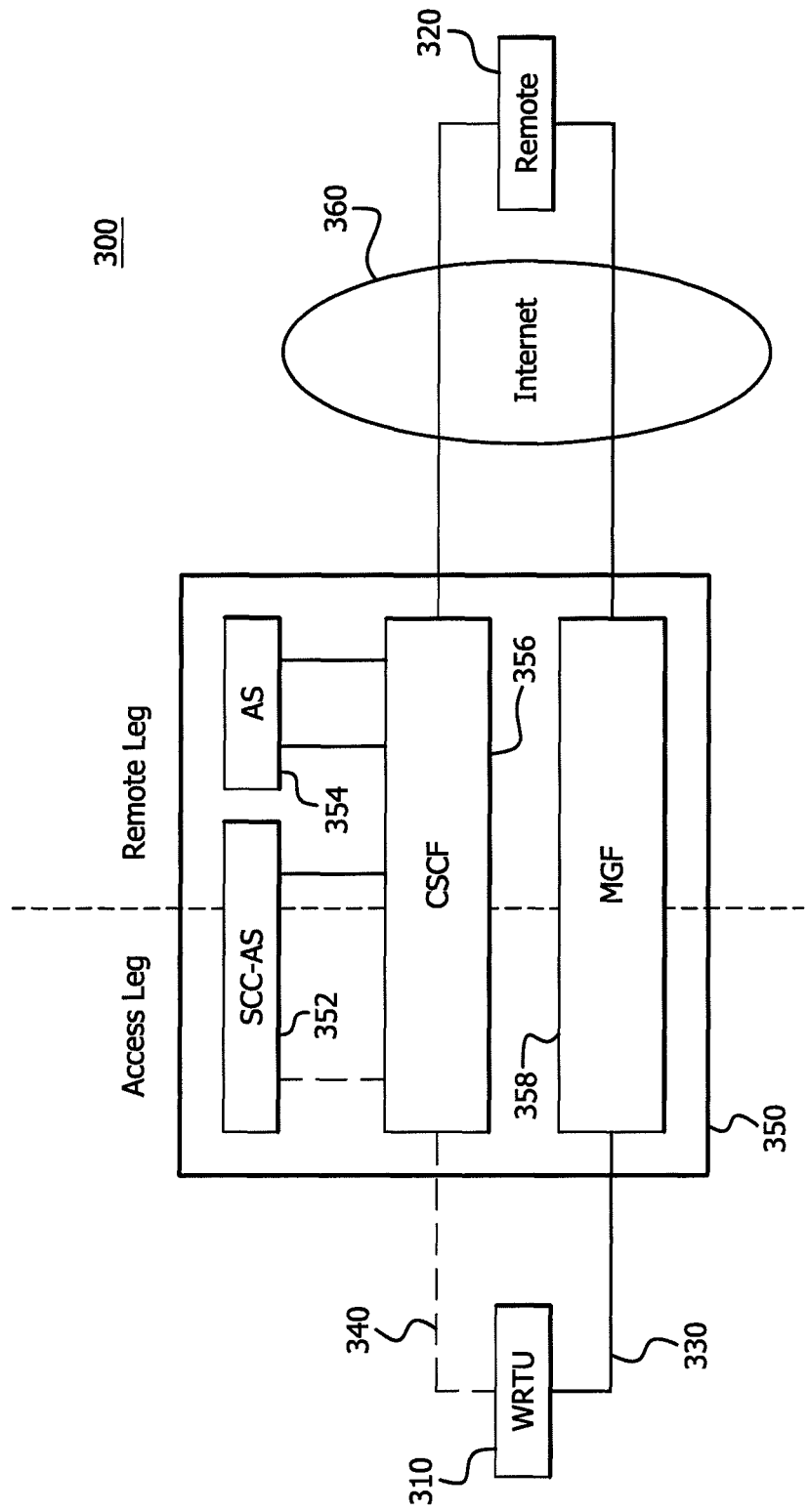
FIG. 3 shows a diagram of an example of a communication session using third party call control.

FIG. 3 shows a diagram of an example of a communication session 300 between a WTRU 310 and a remote device 320 using IMS. The communication session 300 may include media flows 330 (media path) and control signaling 340 (control path) between the WTRU 310 and the remote device 320 via a network 350, such as an IM CN as shown in FIG. 2. The IM CN 350 may include an SCC AS 352, an AS 354, a CSCF 356, and a MGF 358.

The communication session 300 may be anchored at the SCC AS 352 associated with the WTRU 310. For example, the SCC AS 352 may maintain information regarding the communication session, such as media flow identifiers and controlling device identifiers, and may provide call control for the communication session 300. For simplicity, the part of the communication session between the WTRU 310 and the SCC AS 352 may be referred to as the access leg, and the part of the communication session between the SCC AS 352 and the remote device 320 may be referred to as the remote leg.

To establish a communication session 300 using IMS the WTRU 310 may initiate a connection (access leg) via the IM CN 350. The WTRU 310 may receive the media flows 330 via the MGF 358 and control signaling 340 via the CSCF 356. The remote device 320 may participate in the communication session 300 via a remote network (remote leg), such as via the Internet 360.

Figure 4:
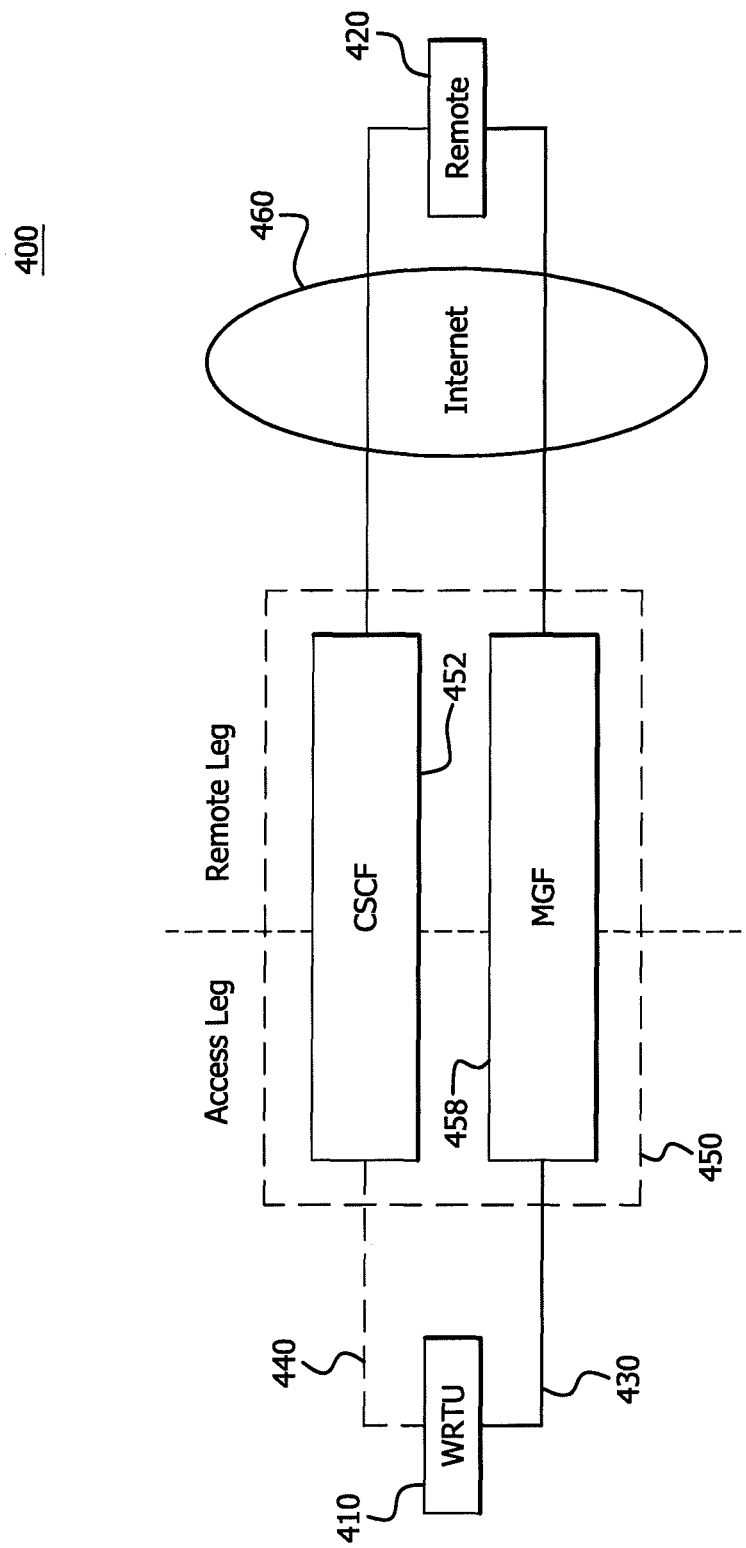
FIG. 4 shows a diagram of an example of a communication session using first party call control.

FIG. 4 shows a diagram of an example of a peer-to-peer communication session 400 between a WTRU 410 and a remote unit 420 using IMS. The communication session 400 may include media flows 430 and control signaling 440 established via a network, which may include an IM CN 450, such as the IM CN shown in FIG. 2. The IM CN 450 may include a CSCF 452 and a MGF 458. The WTRU 410 may also receive control signals and media flows directly from the remote device without the use of the IM CN.

To establish a communication session 400 using IMS the WTRU 410 may initiate a connection (access leg) via the IM CN 450. In the access leg, the WTRU 410 may receive the media flows 430 via the MGF 458 and control signaling 440 via the CSCF 452. The WTRU 410, the remote unit 420, or both may maintain the communication and perform call control functions, for the communication session 400. The remote device 420 may participate in the communication session 400 via a remote network (remote leg), such as via the Internet 460.

Figure 5:
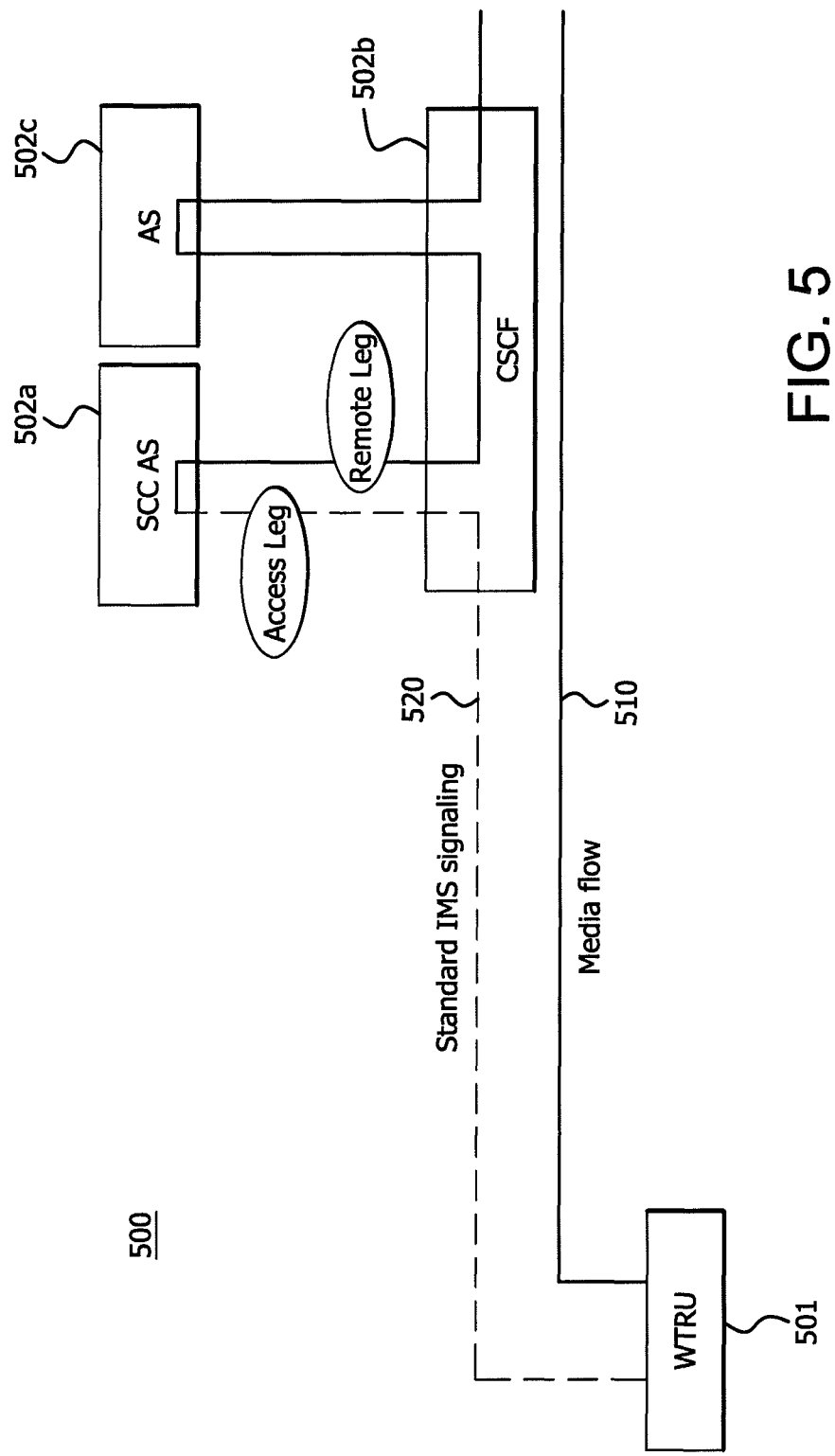
FIG. 5 shows a traditional signaling and bearer architecture for a WTRU in an Internet Protocol (IP) Multimedia Subsystem (IMS) session.

FIG. 5 shows a traditional signaling and bearer architecture for an Internet Protocol (IP) Multimedia Subsystem (IMS) session between a WTRU 501 and a remote party (not shown). Through the IMS session, the WTRU 501 is able to engage in a media flow 510 with the remote party. The WTRU 501 may be connected to the communication session via a network, such as an LTE network. The media flow 510, shown as the solid line in FIG. 5, may be an audio session or a video session, for instance, but other types of media flows are also contemplated. The WTRU 501 maintains control of the media flow 510 by means of media control signaling path 520, shown as the dashed line in FIG. 5, which may include the use of Session Initiation Protocol (SIP) messages.

Control signaling 520 for controlling the media flow 510 of WTRU 501 extends between the WTRU 501 and a Call Session Control Function (CSCF) 502*b*, which processes Session Initiation Protocol (SIP) signaling in the IMS. CSCF 502*b* may act as a proxy server, whereby it may accept control requests, service them internally, translate them, or forward them. Service Centralization and Continuity Application Server (SCC AS) 502*a* provides service continuity for multimedia sessions and an anchor for the IMS communication session. In the embodiment shown in FIG. 5, SCC AS 502*a* establishes an access leg with CSCF 502*b* and WTRU 501, and also establishes a remote leg with CSCF 502*b* and the remote party.

Figure 6:
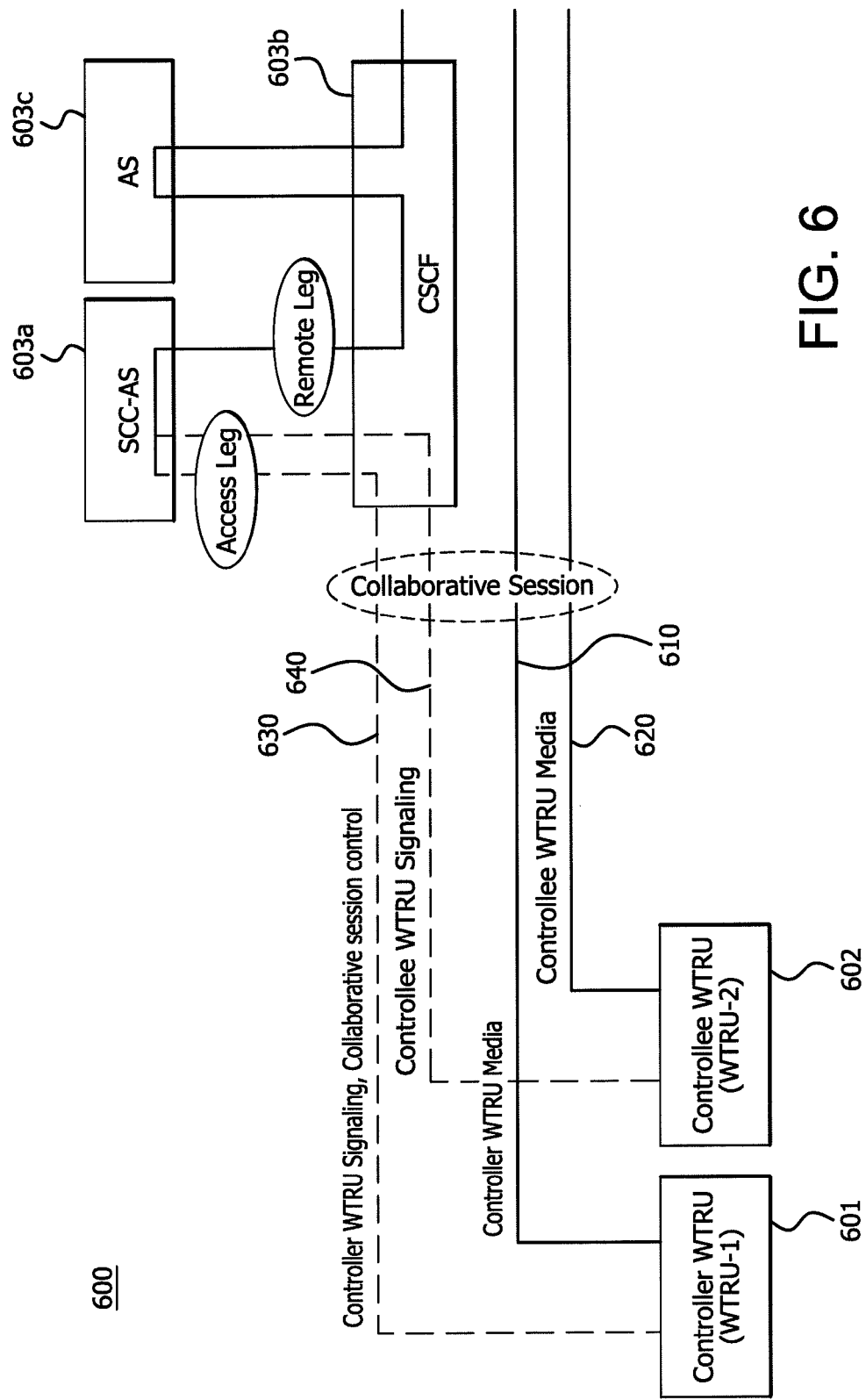
FIG. 6 shows the signaling and bearer paths for two WTRUs in an IMS collaborative session.

FIG. 6 shows the signaling and bearer paths for two WTRUs, WTRU-1 601 and WTRU-2 602, in an IMS collaborative session with a remote party (not shown). WTRU-1 601 has a media path 610 with the remote party, where WTRU-1 601 maintains control of the media session by a media control signaling path 630. WTRU-2 602 maintains control of its media path 620 by another media control signaling path 640.

Further, in this embodiment, WTRU-1 601 is a controller WTRU and WTRU-2 602 is a controllee WTRU, whereby WTRU-1 601 has control over the collaborative media session of the two WTRUs. As a controller WTRU, WTRU-1 601 controls the collaborative session and may add, remove, release, duplicate or transfer media flows among WTRUs that are part of the collaborative session. A controller WTRU may also allow or deny requests by WTRUs that affect the media flows of the collaborative session. For instance, controller WTRU-1 601 may initiate transfer of a media flow, such as a video session, to WTRU-2 602. But it may deny the request of WTRU-2 602 for session transfer. Furthermore, controller WTRU-1 601 may transfer control of the collaborative session to WTRU-2 602, but it may conversely deny the request of WTRU-2 to have control transferred over to it.

WTRU-1 601 and WTRU-2 602 are under the same subscription in FIG. 6, where the collaborative session is anchored in the SCC AS 603*a*, which forms an access leg with WTRU-1 601 and an access leg with WTRU-2 602. A remote leg is presented by SCC AS 603*a* to CSCF 603*b* and the remote party as a standard IMS session. Application Server (AS) 603*c* is executed on the remote leg.

The embodiments detailed herein show the information flows for the transfer of collaborative session control from a controller WTRU to another WTRU. The embodiments show information flows for a target WTRU-initiated collaborative session control transfer, controller WTRU-initiated collaborative session control transfer, SCC AS-initiated collaborative session control transfer, and remote party-initiated collaborative session control transfer. The embodiments detailed herein also describe information flows for Inter Device Transfer (IDT) of media sessions, or flows, from one WTRU to another. The embodiments describe IDT that is anchored at the source SCC AS and IDT that is anchored at the target SCC AS.

In the information flows of the embodiments described herein, SIP messaging may be employed for control plane messaging between WTRUs, SCC ASs, CSCFs, and remote parties.

Figure 7:
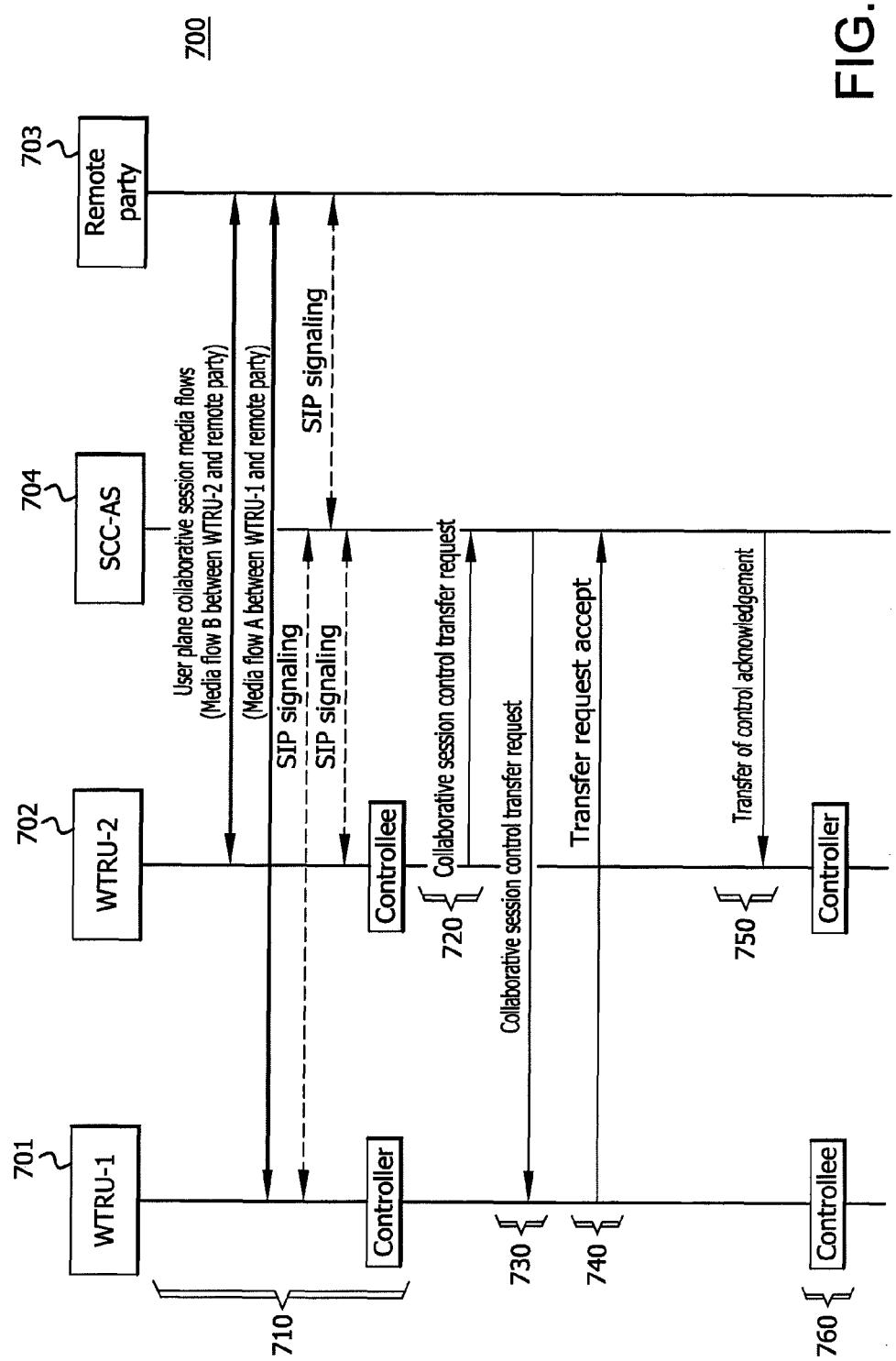
FIG. 7 shows an information flow for a controllee WTRU-initiated transfer of collaborative session control.

FIG. 7 shows an information flow for controllee WTRU-initiated transfer of collaborative session control. In the embodiment 700, a controllee WTRU initiates collaborative session control transfer from a controller WTRU to the controllee WTRU. Initially, a collaborative session is established between WTRU-1 701 and WTRU-2 702 and a remote party 703, with WTRU-1 701 acting as the controller WTRU and WTRU-2 702 acting as the controllee WTRU 710.

The collaborative session is anchored at SCC AS 704. Each WTRU may have a media flow with the remote party 703, where media flow A is between WTRU-1 701 and the remote party 703, and media flow B is between WTRU-2 702 and the remote party 703 710. WTRU-1 701 is currently maintaining control of the collaborative session 710. Further, IMS session initiation protocol (SIP) messaging may be employed in the collaborative session between WTRU-1 701 and WTRU-2 702 and the remote party 703 to provide for linkage and session control 710.

WTRU-1 701 and WTRU-2 702 may be connected via a network, such as the IP-CAN shown in FIG. 3. For simplicity, only the SCC AS 704 is shown; however, the communication paths may include other elements of the IP-CAN, as shown in FIG. 2, and/or the RAN, as shown in FIG. 1. In addition, although a single SCC AS 704 is shown, the communication path may include multiple SCC ASs, CSCFs, and ASs; for example, WTRU-1 701 and WTRU-2 702 may each be associated with a different SCC AS. Although two media flows are shown, collaborative sessions may include any number of communication sessions and media flows across any number of WTRUs.

In the embodiment 700, controllee WTRU-2 702 seeks to transfer the control of the collaborative session from controller WTRU-1 701 to itself. WTRU-2 702 sends a request to SCC AS 704 for transfer of the control of the collaborative session 720. The request may include an identification for the collaborative session whose control is to be transferred, new controller identification (i.e., WTRU-2 702), or the identity of the media flow or flows affected by the transfer. WTRU identification may include registered Public User Identity, public Globally Routable Agent Uniform Resource Identifier (GRUU), a Mobile Subscriber Integrated Services Digital Network Number (MSISDN) based identification, email address-based identification, or Uniform Resource Locator (URL) or Uniform Resource Identifier (URI) based identification.

After receiving a collaborative session control transfer request, an SCC AS 704 may determine whether the transfer of collaborative session control of the media flow, or flows, is allowed. SCC AS 704 may determine whether WTRU-2 702 is party equipped or capable of controlling the collaborative session and executing functions related to the control of the collaborative session. SCC AS 704 may determine whether WTRU-2 702 is allowed (by WTRU-1 701, for instance) of taking control of the collaborative session. It may also determine whether WTRU-2 702 is a trustworthy source. If WTRU-1 701 has a list of trusted devices or users, SCC AS 704 may determine whether WTRU-2 702 or its profile are among the devices or users in the trusted list. Further, SCC AS 704 may determine whether WTRU-2 702 belongs to the same user profile as WTRU-1 701.

SCC AS 704 may request an agreement from the controller WTRU, i.e. WTRU-1 701, or the remote party 703, and in the event that more than one controllee WTRUs are involved in the collaborative session, the SCC AS 704 may update the other controllee WTRUs with information regarding the request for transfer.

SCC AS 704 then sends a collaborative session control transfer request to WTRU-1 701 730. The message requests WTRU-1 701 to accept the transfer of collaborative session control to WTRU-2 702. The request may include relevant information regarding the session including new controller identification (i.e., ID of WTRU-2 702), the ID of the media flow or flows whose control is to be transferred, or media attributes of the session. It is important to identify the collaborative session whose control is sought to be transferred or the media flows affected by collaborative session control transfer particularly when a WTRU is engaged in multiple collaborative sessions.

WTRU-1 701 may solicit the input of the user regarding the request or the acceptance of the request may be triggered according to pre-configured conditions. WTRU-1 701 may accept the request for transfer of control of the collaborative session and indicate the acceptance to SCC AS 704 740. The acceptance may include new controller identification (i.e., ID of WTRU-2 702), or the identification of the media flow or flows whose control is to be transferred. SCC AS removes collaborative session control from WTRU-1 701 and give collaborative session control to WTRU-2 702. SCC AS 704 may in turn update other controllees and may update the remote party 703 with new controller WTRU information. SCC AS 704 may also send to the new controller WTRU, WTRU-2 702, a transfer of control acknowledgement 750. The transfer of control acknowledgement may include session identification for the collaborative session whose control is transferred, new controller identification, or identification of the media flow or flows whose control is transferred. After the transfer of the collaborative session control, WTRU-2 702 has become the controller WTRU and WTRU-1 701 has become the controllee WTRU 760.

Figure 8:
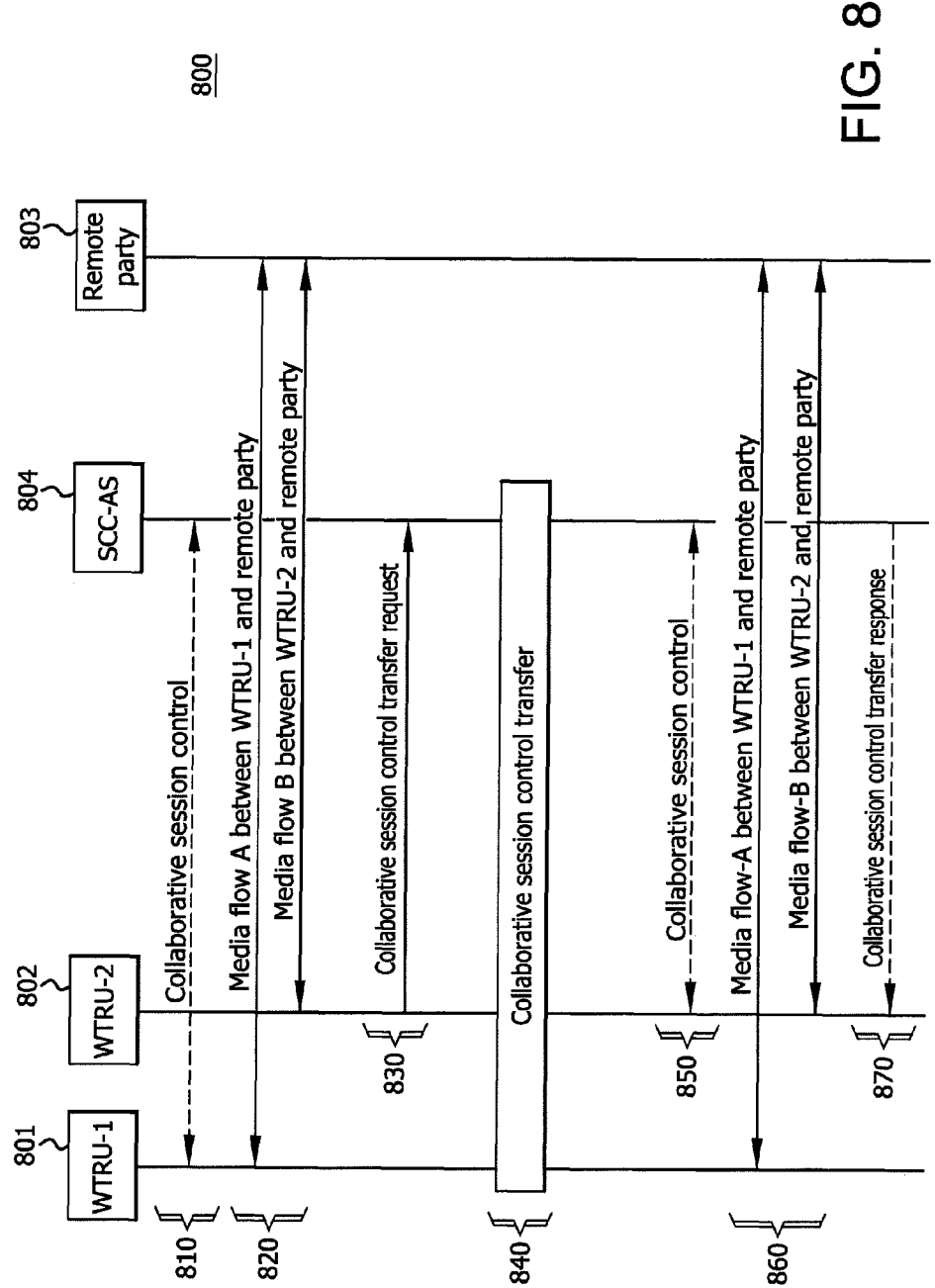
FIG. 8 shows an alternative information flow for a controllee WTRU-initiated collaborative session control transfer.

FIG. 8 shows an alternative embodiment 800 of controllee WTRU-initiated collaborative session control transfer. FIG. 8 shows an information flow of collaborative session control transfer where WTRU-1 801 and WTRU-2 802 are in a collaborative session with a remote party 803 and where the collaborative session is anchored at SCC AS 804.

WTRU-1 801 and WTRU-2 802 may be connected via a network, such as the IP-CAN shown in FIG. 3. For simplicity, only the SCC AS 804 is shown; however, the communication paths may include other elements of the IP-CAN, as shown in FIG. 2, and/or the RAN, as shown in FIG. 1. In addition, although a single SCC AS 804 is shown, the communication path may include multiple SCC ASs, CFCFs, and ASs. Although two media flows are shown, collaborative sessions may include any number of communication sessions and media flows across any number of WTRUs.

WTRU-1 801, as a controller WTRU, maintains control of the collaborative session using collaborative session control signaling with SCC AS 804 810. WTRU-2 802, on the other hand, is a controllee WTRU. Each WTRU may have a media flow with the remote party, where media flow A is between WTRU-1 801 and the remote party 803 and media flow B is between WTRU-2 802 and the remote party 803 820.

WTRU-2 802 seeks to transfer collaborative session control from WTRU-1 801 to itself. It is worth noting that the existing media flows may remain unaffected by the collaborative session control transfer. WTRU-2 802 sends a collaborative session control transfer request to the SCC AS 804 to obtain collaborative session control 830. The request may include an identity of WTRU-1 801. The request may also include collaborative session identification, controller WTRU identification, or the identities of the collaborative session media flows affected by the control transfer.

SCC AS 804 may also determine whether the transfer is allowed, may solicit agreement from the controller WTRU, WTRU-1 801, or the remote party 803, or may update other controllees with the information regarding the collaborative session control transfer request. SCC AS 804 may ensure that WTRU-2 802 is able to act as the controller WTRU for this collaborative session.

The SCC AS 804 may request the controller WTRU, WTRU-1 801, to authorize the request for transfer of control, or the SCC AS 804 may authorize the request on behalf of WTRU-1 (for instance, if pre-configuration calls for that). If the request is authorized, SCC AS 804 may transfer collaborative session control to WTRU-2 802 and remove collaborative session control from WTRU-1 801 840.

WTRU-2 802 becomes the controller WTRU and WTRU-1 801 becomes a controllee WTRU. As a controller WTRU, WTRU-2 802 maintains collaborative session control through collaborative session control signaling with SCC AS 804 850. Media flow A may remain between WTRU-1 801 and the remote party 803 and media flow B may remain between WTRU-2 802 and the remote party 803 860 as these media flows may remain unaffected by collaborative session control transfer. SCC AS 804 may update the remote party 803 or other controllee WTRUs with the new controller WTRU. Further, SCC AS 804 may send a collaborative session control transfer response to WTRU-2 802 870 that may indicate that collaborative session control has been transferred.

Figure 9:
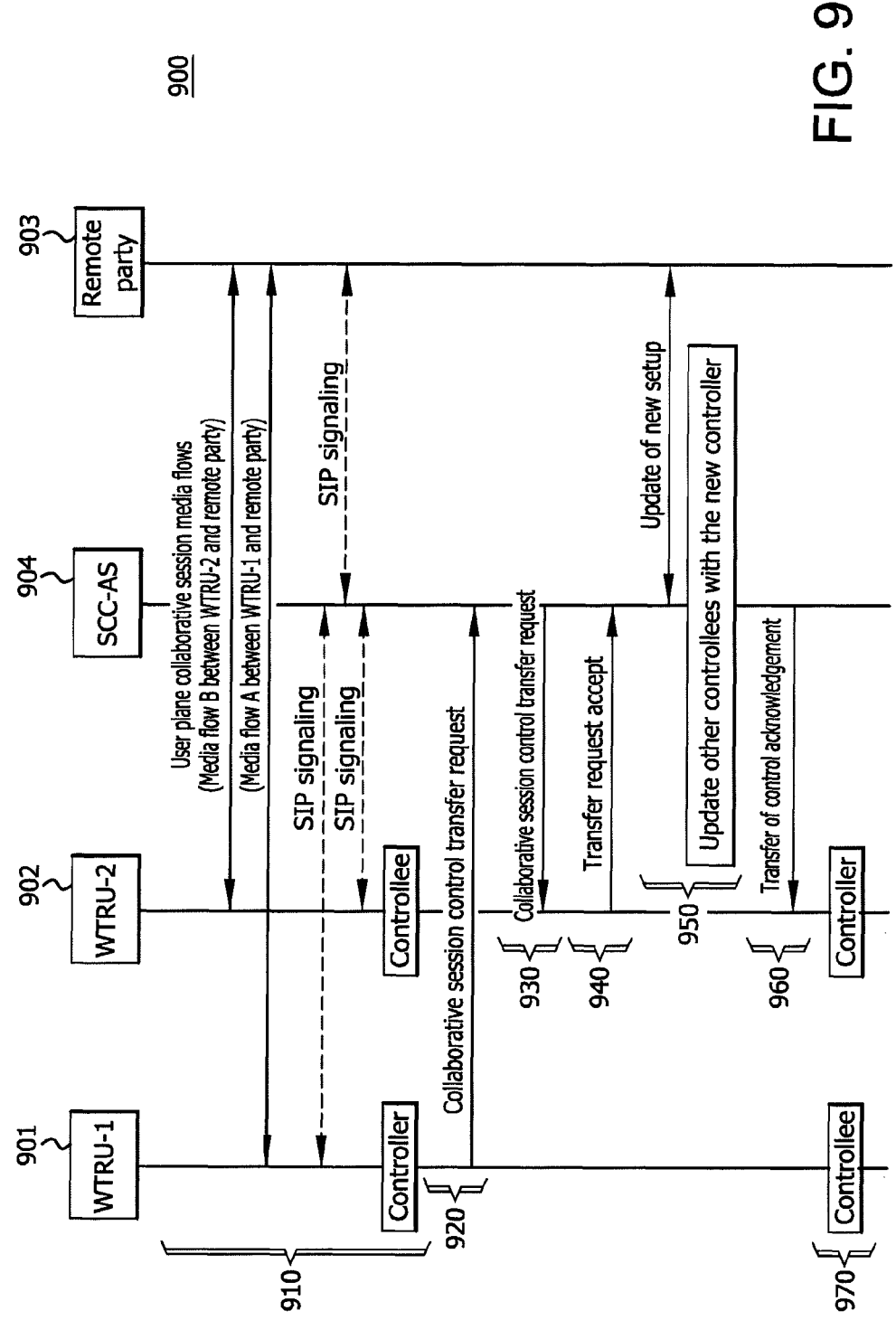
FIG. 9 shows an information flow for a controller WTRU-initiated transfer of collaborative session control.

FIG. 9 shows an information flow for a controller WTRU-initiated transfer of collaborative session control from a controller WTRU to controllee WTRU. Initially, a collaborative session is established between the WTRU-1 901 and WTRU-2 902 and a remote party 903, with WTRU-1 901 acting as the controller WTRU and WTRU-2 902 acting as the controllee WTRU 910. Each WTRU has a media flow with the remote party 903, where media flow A is between WTRU-1 901 and the remote party 903 and media flow B is between WTRU-2 902 and the remote party 903 910. WTRU-1 is currently maintaining control of the collaborative session, which is anchored at SCC AS 904. Further, SIP messaging may be employed in the collaborative session to provide for linkage and session control 910. SIP signaling may be used by WTRU-1 901 for collaborative session control signaling and for controlling media flow A 910. Furthermore, SIP signaling may be used by WTRU-2 902 for controlling media flow B 910.

WTRU-1 901 and WTRU-2 902 may be connected via a network, such as the IP-CAN shown in FIG. 3. For simplicity, only the SCC AS 904 is shown; however, the communication paths may include other elements of the IP-CAN, as shown in FIG. 2, and/or the RAN, as shown in FIG. 1. In addition, although a single SCC AS 904 is shown, the communication path may include multiple SCC ASs, CFCFs, and ASs, for example, WTRU-1 901 and WTRU-2 902 may each be associated with a different SCC AS. Although two media flows are shown, a collaborative session may include any number of communication sessions and media flows across any number of WTRUs.

In the embodiment 900, WTRU-1 901 seeks to transfer collaborative session control to WTRU-2 902. WTRU-1 901 sends a request to SCC AS 904 to transfer the control of the collaborative session to WTRU-2 902 920. The request may include a session ID for the collaborative session to be transferred, a new controller ID (i.e. ID of WTRU-2), or the ID of the media flow or flows whose control is to be transferred. It is worth noting that if the controller WTRU has only one collaborative session, the identification of the collaborative session whose control is to be transferred may not be provided in the request. Instead, the identify of the collaborative session whose control is sought to be transferred may be determined by SCC AS 904 knowing the identity of WTRU-1 901. Conversely it is important to identify the collaborative session whose control is sought to be transferred when the WTRUs are involved in more than one collaborative session.

Upon receiving a collaborative session control transfer request, an SCC AS 904 may determine whether the transfer of collaborative session control is allowed. For instance, the SCC AS 904 may request an agreement from the WTRU to which session control is to be transferred (i.e. WTRU-2 902). Furthermore, in the event that more than one controllee WTRUs are involved, the SCC AS 904 may update the other controllee WTRUs with information regarding the request for transfer of collaborative session control.

SCC AS 904 then sends a collaborative session control transfer request to WTRU-2 902 930. The message requests WTRU-2 902 to become the controller WTRU for the collaborative session. The request may include a collaborative session identification, new controller ID (ID of WTRU-2 902), the ID of the media flow or flows whose control is to be transferred. WTRU-2 902 may solicit the input of the user regarding the request or trigger the acceptance of the request according to pre-configured conditions. For instance, WTRU-2 902 may be configured to always accept collaborative session control transfer from WTRU-1 901.

WTRU-2 902 may indicate its acceptance of collaborative session control transfer to SCC AS 904 940. The acceptance may include a new controller ID (ID of WTRU-2 902), or the ID of the media flow or flows whose control is to be transferred. SCC AS 904 may in turn remove session control from WTRU-1 901 and give session control to WTRU-2 902. Further, SCC AS 904 may update other controllee WTRUs with the new controller WTRU setup and may update the remote party with the controller WTRU-controllee WTRU setup 950. SCC AS 904 may also send to the new controller WTRU, WTRU-2 902, a transfer of control acknowledgement 960. The transfer of control acknowledgement may include a session ID for the collaborative session, a new controller ID, or the ID of the media flow or flows whose control is transferred. After the transfer of the collaborative session control, WTRU-2 902 has become the controller WTRU and WTRU-1 901 has become the controllee WTRU 970.

Figure 10:
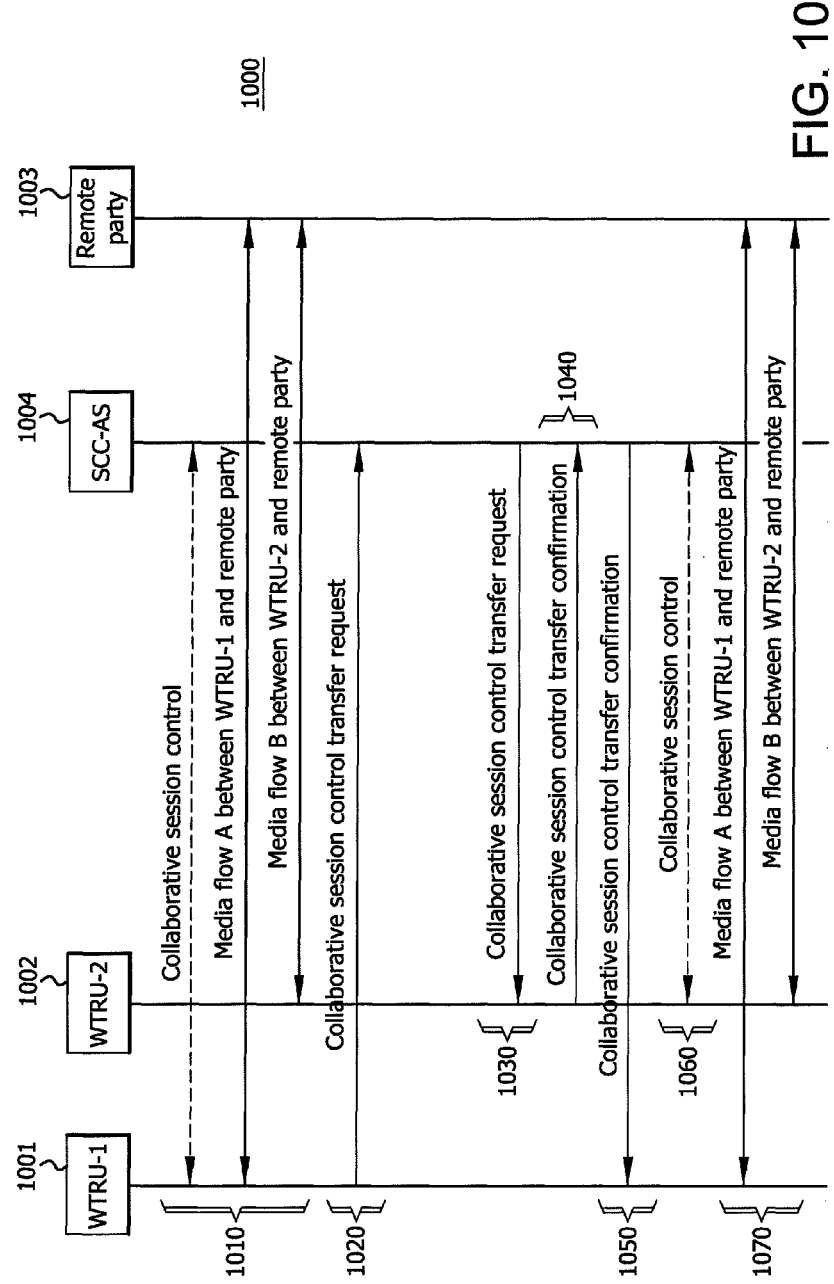
FIG. 10 shows an alternative information flow for controller WTRU-initiated transfer of collaborative session control.

FIG. 10 shows an alternative embodiment 1000 of an information flow for controller-initiated collaborative session control transfer. In FIG. 10, WTRU-1 1001 and WTRU-2 1002 are in a collaborative session with a remote party 1003, where the collaborative session is anchored at SCC AS 1004. WTRU-1 1001 seeks to transfer collaborative session control to WTRU-2 1002. WTRU-1 1001 is a controller WTRU and therefore maintains control of the collaborative session using collaborative session control signaling with SCC AS 1004 1010. WTRU-2 1002, on the other hand, is a controllee WTRU. Each WTRU has a media flow with the remote party, where media flow A is between WTRU-1 1001 and the remote party 1003 and media flow B is between WTRU-2 1002 and the remote party 1003 1010.

WTRU-1 1001 seeks to transfer the collaborative session control to WTRU-2 1002, where the existing media flows may remain unaffected by collaborative session control transfer. WTRU-1 1001 sends a collaborative session control transfer request to the SCC AS 1004 to relinquish collaborative session control 1020. The request may include a registered Public User Identity or GRUU of WTRU-2 1002. The request may also include collaborative session identification, controller WTRU identification, or the identities of the collaborative session media flows affected by the control transfer.

SCC AS 1004 may determine whether the transfer is allowed, may solicit agreement from the controller WTRU or the remote party, or may update other controllees with the information regarding the received collaborative session control transfer. SCC AS 1004 may ensure that WTRU-2 1002 may act as the Controller WTRU for the collaborative session, and that the identity used by WTRU-2 1002 shares a service profile with the identity used by WTRU-1 1001 for the collaborative session.

SCC AS 1004 then requests WTRU-2 1002 to assume the role of controller WTRU for the collaborative session 1030, where SCC AS 1004 sends a collaborative session control transfer request to WTRU-2 1002, where the request may include the identity of the WTRU to which control is to be transferred, i.e. WTRU-2 1002. The request may include the identity of the media flows affected by the transfer.

WTRU-2 1002 may accept the role of controller WTRU for the collaborative session and indicate its acceptance to the SCC AS 1004 1040. The acceptance may include the identity of the WTRU to which control is to be transferred, i.e. WTRU-2 1002, or the identity of the media flows whose control is to be transferred. SCC AS 1004 send an acknowledgement to WTRU-1 1001, confirming that WTRU-2 1002 is the new controller WTRU for the collaborative session 1050, and removes collaborative session control from WTRU-1 1001. WTRU-2 1002 becomes the controller WTRU 1060 and WTRU-1 1001 has become a controllee WTRU, while media flow A may remain between WTRU-1 1001 and the remote party 1003 and media flow B may remain between WTRU-2 1002 and the remote party 1003 1070. SCC AS 1004 may update the remote party 1003 as well as other controllee WTRUs with the new controller WTRU setup. SCC AS 1004 may also send a collaborative session control transfer acknowledgement to WTRU-2 1002 including session identification, new controller WTRU identification, or the identity of the media flows that are affected by the transfer of control.

Figure 11:
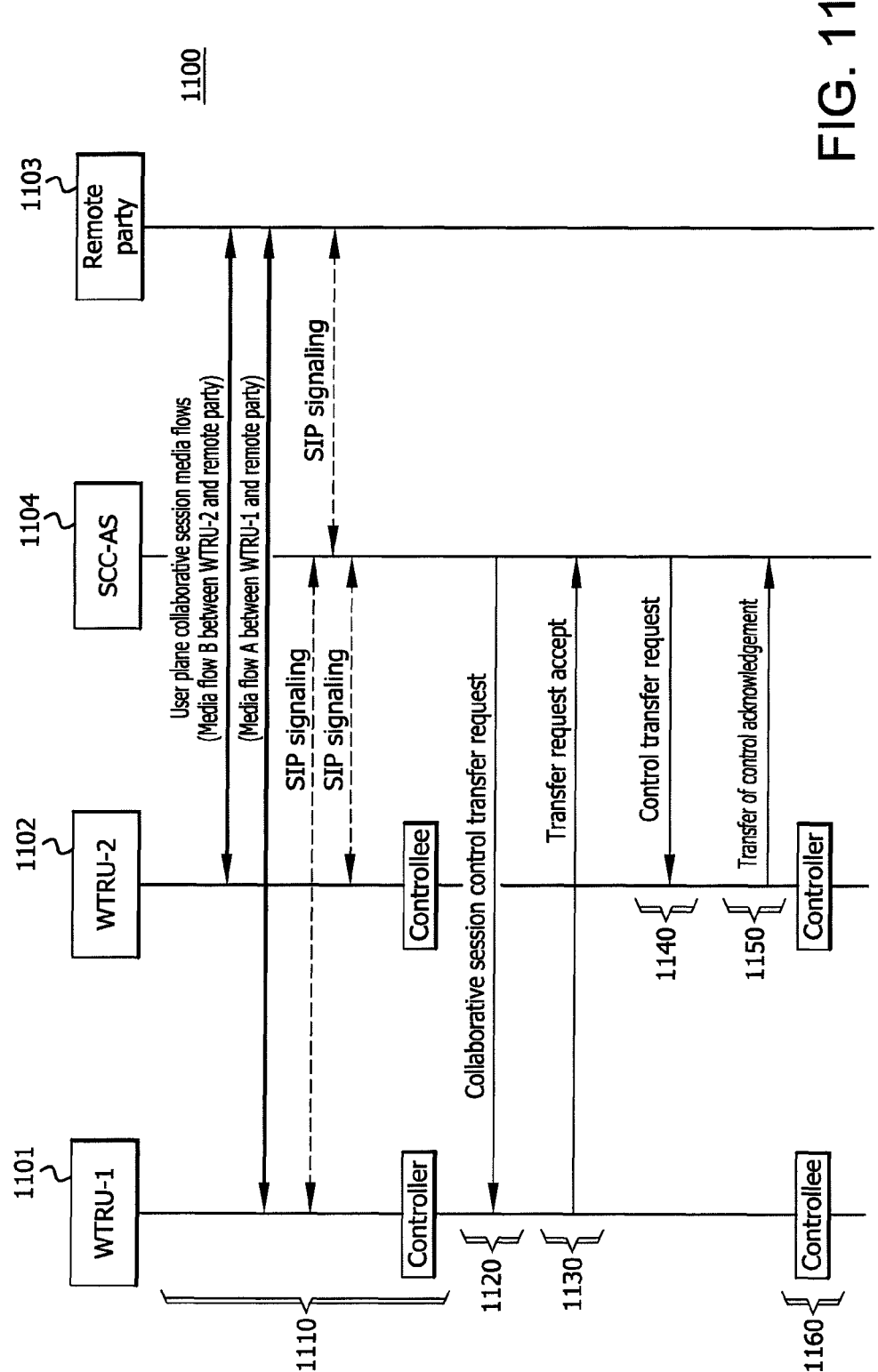
FIG. 11 shows an information flow of SCC AS-initiated transfer of collaborative session control.

FIG. 11 shows the information flow of SCC AS-initiated transfer of collaborative session control. In the embodiment 1100, a controller WTRU, WTRU-1 1101, transfers collaborative session control to a controllee WTRU, WTRU-2 1102. The collaborative session is anchored at the SCC AS 1104. In this embodiment 1100, collaborative session transfer is initiated by the SCC AS 1104.

Initially, a collaborative session is established between WTRU-1 1101 and WTRU-2 1102 and a remote party 1103, with WTRU-1 1101 being a controller WTRU and WTRU-2 1102 being a controllee WTRU 1110. Each WTRU has a media flow with the remote party 1103, where media flow A is between WTRU-1 1101 and the remote party 1103 and media flow B is between WTRU-2 1102 and the remote party 1103 1110. SIP signaling may be employed for media session control and collaborative session control, where SIP signaling for controlling both media flow A and the collaborative session runs between WTRU-1 1101, SCC AS 1104, and the remote party 1103 1110. Furthermore, SIP signaling for controlling media flow B runs between WTRU-2 1102, SCC AS 1104, and the remote party 1103 1110.

In the embodiment 1100, SCC AS 1104 seeks to transfer control of the collaborative session from WTRU-1 1101 to WTRU-2 1102. The collaborative control transfer may be initiated by the SCC AS 1104 because of a user profile, current conditions (for instance, the connection of the controller WTRU, WTRU-1 1101, to the SCC AS 1104 has degraded), or according to a preconfiguration. SCC AS 1104 may also request an agreement regarding the transfer of session control from a controller WTRU, a controllee WTRU, or a remote party. Furthermore, other controllee WTRUs may be updated regarding the impending request for the transfer of session control.

SCC AS 1104 sends a request to WTRU-1 1101 to transfer the control of the collaborative session to WTRU-2 1102 1120. The request may include a session ID for the collaborative session to be transferred, a new controller ID (i.e., ID of WTRU-2 1102), or the ID of the media flow or flows whose control is to be transferred. The controller WTRU, WTRU-1 1101, may solicit user input regarding responding to the request or trigger acceptance of the transfer of collaborative session control request according to pre-configured conditions.

WTRU-1 1101 may accept the request for transfer of control of this collaborative session and indicate the acceptance to SCC AS 1104 1130. The acceptance may include a new controller ID (ID of WTRU-2 1102), or the ID of the media flow or flows to be transferred.

SCC AS 1104 may then send collaborative session control transfer request to WTRU-2 1102 1140. The control transfer request may include a new controller ID, or the ID of the media flow or flows whose control is to be transferred. WTRU-2 1102 may solicit user input as to whether to accept transfer of collaborative session control or may trigger acceptance of the transfer according to preconfigured conditions. WTRU-2 1102 may send a transfer of control acknowledgement to SCC AS 1104 1150. The acknowledgement may include a session ID for the collaborative session to be transferred, a new controller ID (ID of WTRU-2 1102), or the ID of the media flow or flows to be transferred. SCC AS 1104 may transfer collaborative session control to WTRU-2 1102 and may further update the remote party 1103 and other controllee WTRUs with the new controller WTRU setup. After collaborative session control is transferred, WTRU-2 1102 has become the controller WTRU and WTRU-1 1101 has become the controllee WTRU 1160.

Figure 12:
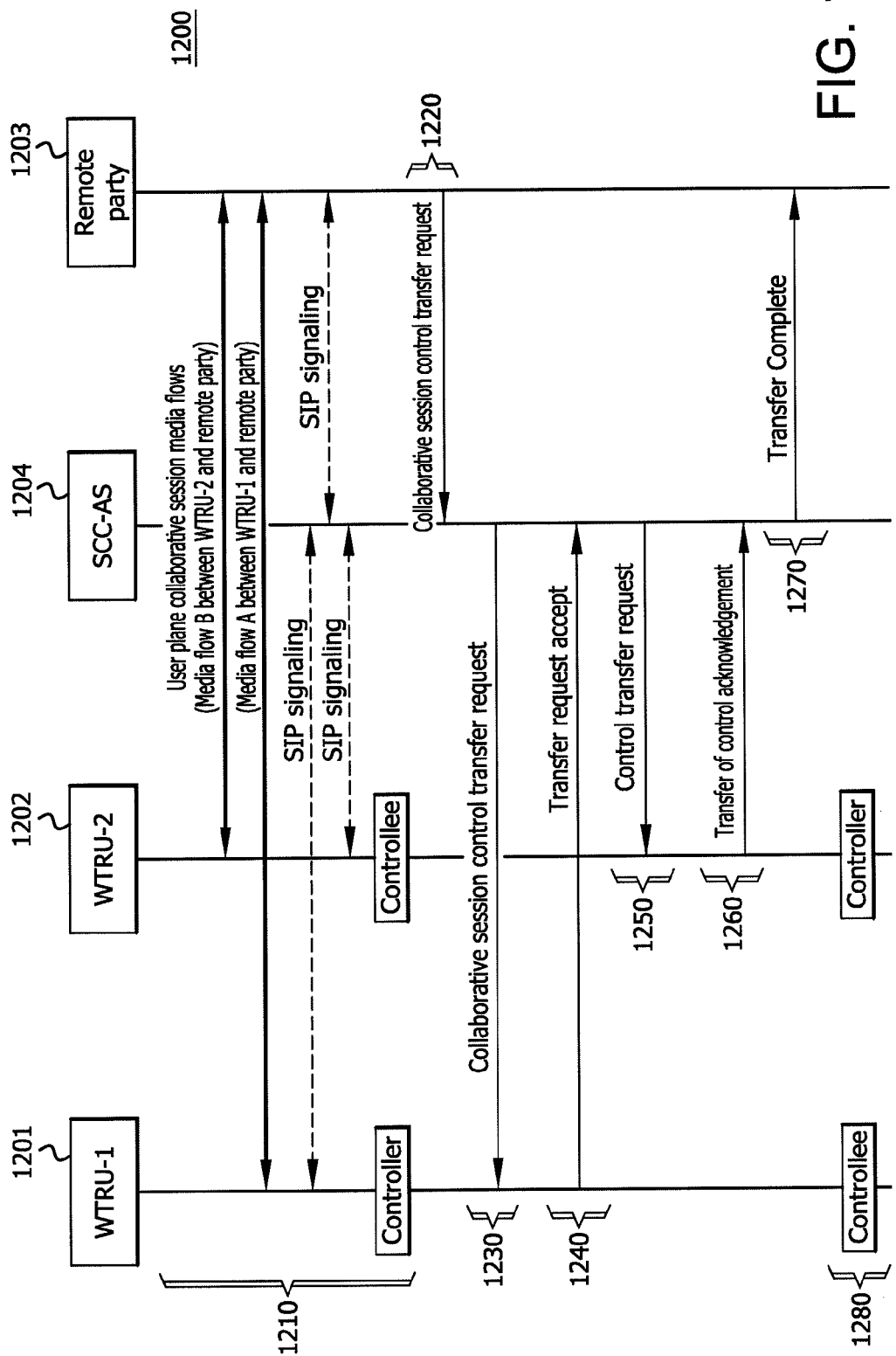
FIG. 12 shows an information flow of a remote party-initiated transfer of collaborative session control.

FIG. 12 shows an information flow of a remote party-initiated transfer of collaborative session control. In the embodiment 1200 of FIG. 12, a controller WTRU, WTRU-1 1201, transfers collaborative session control to a controllee WTRU, WTRU-2 1202. The collaborative session is anchored at SCC AS 1204. In this embodiment 1200, the collaborative session control transfer is initiated by the remote party 1203, where the remote party may be a WTRU. Initially, a collaborative session is established between WTRU-1 1201 and WTRU-2 1202 and a remote party 1203 1210. Each WTRU has a media flow with the remote party 1203, where media flow A is between WTRU-1 1201 and the remote party 1203 and media flow B is between WTRU-2 1202 and the remote party 1203 1210. Further, IMS session initiation protocol (SIP) messaging may be employed in the collaborative session to provide for linkage and session control 1210.

In the embodiment 1200, collaborative session control transfer may initiated by the remote party 1203 because of a user input or according to a preconfiguration. The remote party 1203 sends a request to SCC AS 1204 to transfer the control of the collaborative session 1220. The request may be a transfer of control command and may be an SIP message. The request may include session identification for the collaborative session to be transferred, a new controller identification (ID of WTRU-2 1202), or the ID of the media flow or flows whose control is to be transferred. SCC AS 1204 may request agreements from the controller WTRU or from the controllee WTRU, and if there are multiple controllee WTRUs in the collaborative session, these other controllees may be updated with the request for transfer of session control. SCC AS 1204 may then send a request for transfer of collaborative session control to WTRU-1 1201 1230. The request may include session identification for the collaborative session to be transferred, a new controller identification (ID of WTRU-2 1202), or the ID of the media flow or flows whose control is to be transferred.

WTRU-1 1201 may accept the request for transfer of control of this collaborative session and indicates the acceptance to SCC AS 1204 1240. The acceptance may include a new controller ID (ID of WTRU-2 1202), or the ID of the media flow or flows whose control is to be transferred. SCC AS 1204 may then send control transfer request to WTRU-2 1202 1250. The control transfer request may include a new controller ID, or the ID of the media flow or flows whose control is to be transferred. WTRU-2 1202 may solicit user input as to whether to accept transfer of collaborative session control or may trigger acceptance of the transfer according to preconfigured conditions. WTRU-2 1202 may send a transfer of control acknowledgement to SCC AS 1204 and may indicate in the acknowledgement acceptance of collaborative session control transfer 1260. The acknowledgement may include a session ID for the collaborative session to be transferred, a new controller ID (ID of WTRU-2 1202), or the ID of the media flow or flows to be transferred. Following collaborative session control transfer, SCC AS 1204 may indicate to the remote WTRU 1203 that the transfer of session control is complete 1270. SCC AS 1204 may further update other controllee WTRUs with new controller information. After the transfer of the collaborative session control, WTRU-2 1202 has become the controller WTRU and WTRU-1 1201 has become the controllee WTRU 1280.

Figure 13:
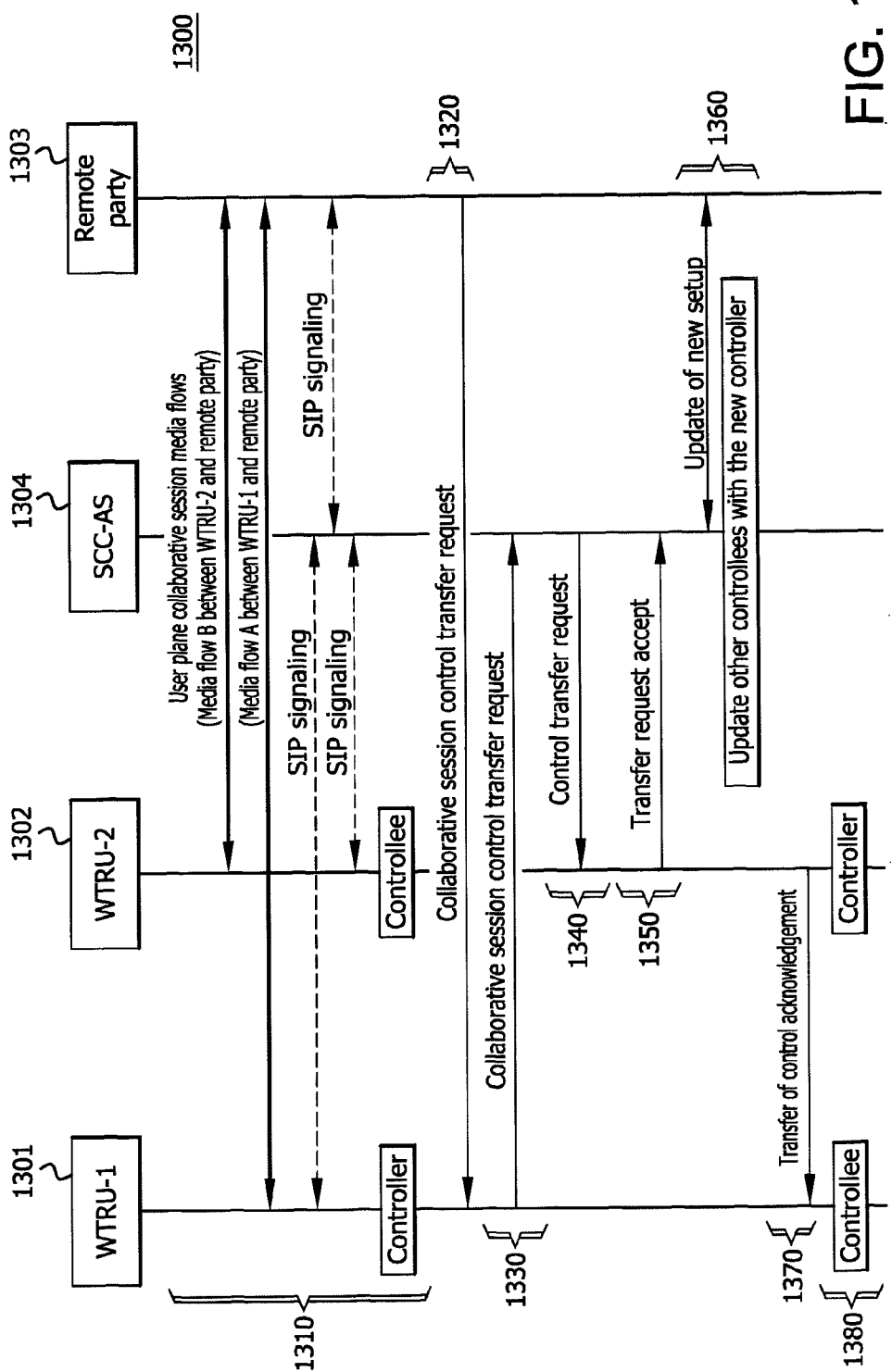
FIG. 13 shows an information flow of a remote party-initiated transfer of collaborative session control.

FIG. 13 shows an alternative information flow of a remote party-initiated transfer of collaborative session control. In the embodiment 1300, a controller WTRU, WTRU-1 1301, transfers collaborative session control to a controllee WTRU, WTRU-2 1302. The collaborative session is anchored at SCC AS 1304. In this embodiment 1300, the collaborative session transfer is initiated by the remote party 1303. Initially, a collaborative session is established between the WTRU-1 1301 and WTRU-2 1302 and a remote party 1303, with WTRU-1 1301 acting as the controller WTRU and WTRU-2 1302 acting as the controllee WTRU 1310. Each WTRU has a media flow with the remote party 1303, where media flow A is between WTRU-1 1301 and the remote party 1303 and media flow B is between WTRU-2 1302 and the remote party 1303 1310. WTRU-1 1301 is currently maintaining control of the collaborative session, where SIP signaling may be used for collaborative session control 1310. Further, SIP signaling may be used by WTRU-1 1301 and WTRU-2 1302 for controlling their media sessions 1310.

In the embodiment 1300, the remote party 1303 desires for the control of the collaborative session to be transferred from WTRU-1 1301 to WTRU-2 1302. The collaborative control transfer may be initiated by the remote party 1303 because of a user input or according to a preconfiguration. The remote party 1303 sends a request to WTRU-1 1301 to transfer control of the collaborative session to WTRU-2 1302 1320. The request may include a session ID for the collaborative session whose control is to be transferred, a new controller ID (ID of WTRU-2 1302), or the ID of the media flow or flows whose control is to be transferred. WTRU-1 1301 may solicit the input of the user regarding the request or trigger the acceptance of the request according to pre-configured conditions.

WTRU-1 1301 sends a request to SCC AS 1304 to transfer the control of the collaborative session to WTRU-2 1302 1330. The request may include a session ID for the collaborative session to be transferred, a new controller ID (i.e., ID of WTRU-2 1302), or the ID of the media flow or flows whose control is to be transferred. After receiving a collaborative session control transfer request, an SCC AS 1304 may determine whether the transfer of collaborative session control of the media flow or flows is allowed. For instance, the SCC AS 1304 may request an agreement from the WTRU to which session control is requested to be transferred (WTRU-2 1302) or may request an agreement from the remote party 1303. Furthermore, in the event that more than one controllee WTRUs are involved, the SCC AS may update the controllee WTRUs with information regarding the request for transfer.

Then, the SCC AS 1304 sends a collaborative control transfer request message to WTRU-2 1302 1340. The message requests WTRU-2 1302 to become the controller WTRU for the collaborative session between WTRU-1 1301 and WTRU-2 1302 and the remote party 1303. The request may include a new controller ID (ID of WTRU-2), or the ID of the media flow or flows whose control is to be transferred. WTRU-2 1302 may solicit the input of the user regarding the request or trigger the acceptance of the request according to pre-configured conditions.

WTRU-2 1302 may accept the request for transfer of control of this collaborative session and indicates the acceptance to SCC AS 1304 1350. The acceptance may include a new controller ID (ID of WTRU-2 1302), or the ID of the media flow or flows to be transferred. SCC AS 1304 may transfer collaborative session control from WTRU-1 1301 to WTRU-2 1302. SCC AS 1304 may in turn also update other controllee WTRUs and may update the remote party 1303 with the new controller WTRU-controllee WTRU setup 1360. SCC AS 1304 may also send to the new controller WTRU, WTRU-2 1302, a collaborative session transfer of control acknowledgement 1370. The transfer of control acknowledgement may include a session ID for the collaborative session, a new controller ID, or the ID of the media flow or flows whose control is transferred. After the transfer of the collaborative session control, WTRU-2 1302 has become the controller WTRU and WTRU-1 1301 has become the controllee WTRU 1380.

Figure 14:
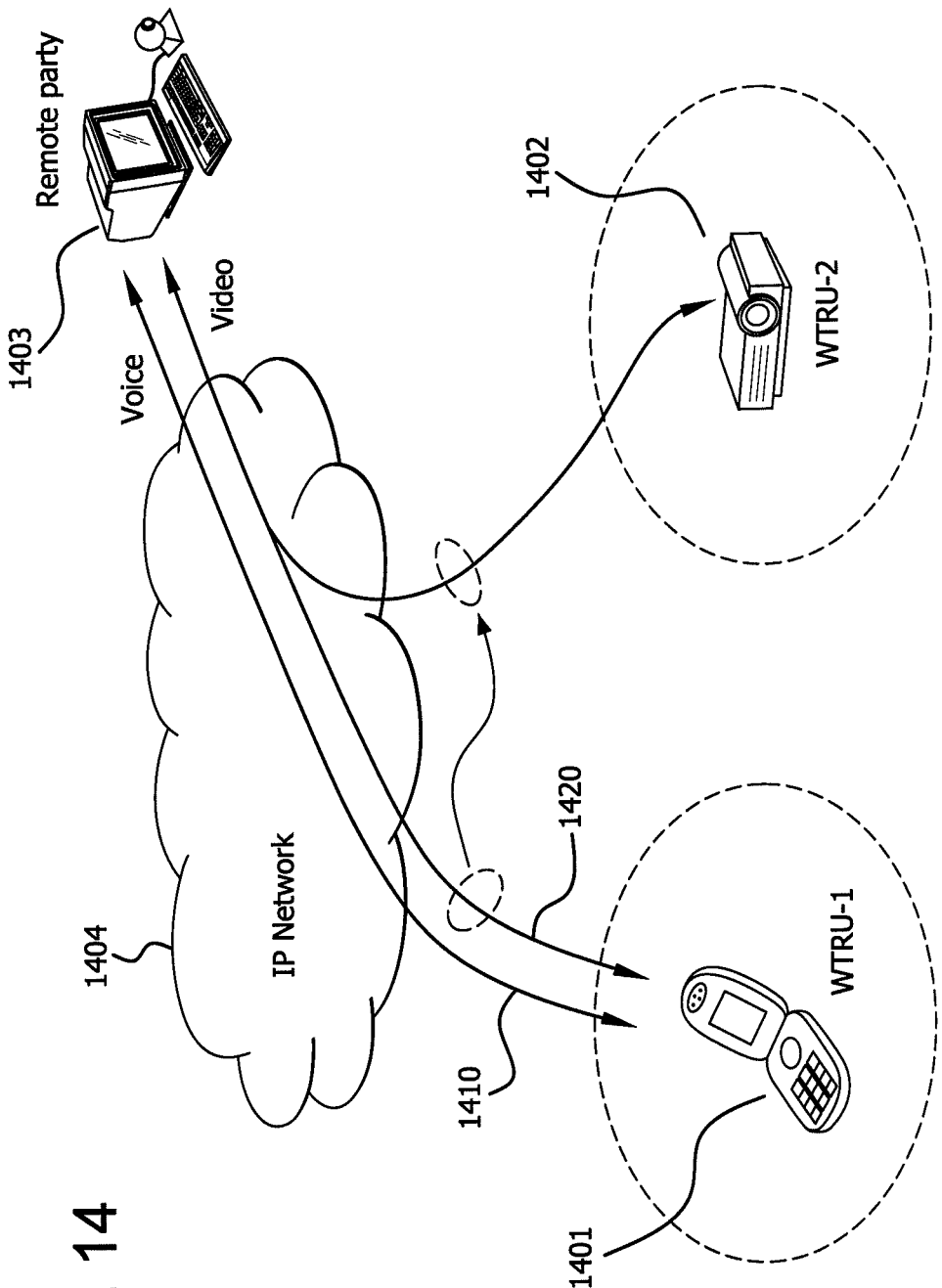
FIG. 14 shows an illustration of a WTRU in a IMS session with a remote party over an IP network.

FIG. 14 shows an illustration of a WTRU, WTRU-1 1401, in an IMS session with a remote party 1403 over an IP network 1404. The IMS session has two media flows; a voice flow 1410 and a video flow 1420. WTRU-1 1401 seeks to transfer the video media flow 1420 to WTRU-2 1402. The transfer may be due to a user input or may be due to preconfigured conditions. For instance, WTRU-1 1401 may be preconfigured to transfer the video flow of an IMS session to a WTRU that display video in the living room when the geographical location of the user indicates that her/him is in their living room. The two WTRUs may belong to the same or different IMS subscriptions and thereby may be serviced by the same SCC AS or different SCC ASs, respectively.

Following the Inter Device Transfer (IDT), WTRU-1 1401 maintains a voice media flow 1410 with the remote party 1403, whereas WTRU-2 1402 maintains a video media flow 1420 with the remote party 1403. The two media flows combine to make an IMS collaborative session, where WTRU-1 1401 may be the controller WTRU and WTRU-2 1402 may be a controllee WTRU. Other WTRUs may also be involved in the collaborative session, as controllee WTRUs for instance, and have media flows transferred or added to them, or deleted from them. Control of the collaborative session may also be transferred from a controller WTRU to other WTRUs.

Figure 15:
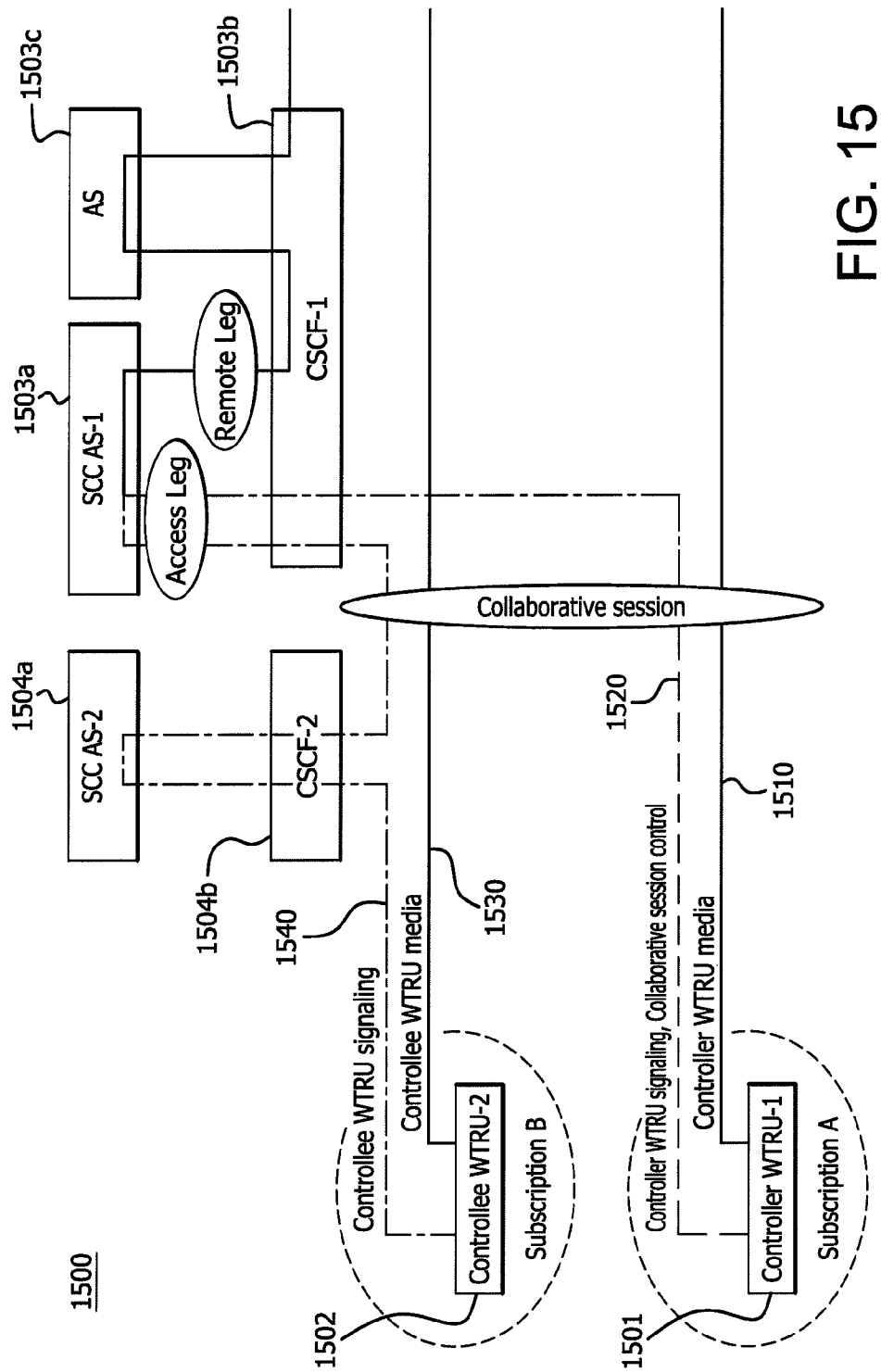
FIG. 15 shows the control and user plane paths for a collaborative session between WTRUs belonging to different IMS subscriptions.

FIG. 15 shows the control and user plane paths for a collaborative session between WTRUs belonging to different IMS subscriptions. In the embodiment 1500 WTRU-1 1501 belongs to subscription A, whereas WTRU-2 1502 belongs to subscription B. However, in alternative embodiments WTRU-1 1501 and WTRU-2 1502 may belong to the same subscription without deviating from the spirit of the embodiments described herein. Further, WTRU-1 1501 has a media session 1510 as part of the collaborative session and its associated signaling is shown as the solid line in FIG. 15. The dashed line shows the media control plane signaling 1520 of WTRU-1's 1501 media session. Furthermore, the dashed line also represents collaborative session control signaling of WTRU-1 1501, the controller WTRU.

WTRU-2 1502 also has media session signaling 1530 as part of the collaborative session and maintains control of the media session through session control signaling 1540. SCC AS-2 1504a serves WTRU-2 1502, admits requests and may perform access control over the requests, where for instance some requests may be denied because they do not meet access requirements. SCC AS-2 1504a may relay signaling associated with the collaborative session to SCC AS-1 1503a using standard IMS signaling. Before relaying requests, SCC AS-2 1504a may determine whether more information is to be sent and may therefore send the information.

SCC AS-1 1503a, on the other hand, serves the controller WTRU, WTRU-1 1501, and forms an access leg with WTRU-1 1501 and WTRU-2 1502 through signaling to SCC AS-2 1504a. Furthermore, SCC AS-1 1503a anchors the remote leg of the collaborative session and therefore executes service requests towards the remote end. Application Server (AS) 1503c is executed on the remote leg.

Figure 16:
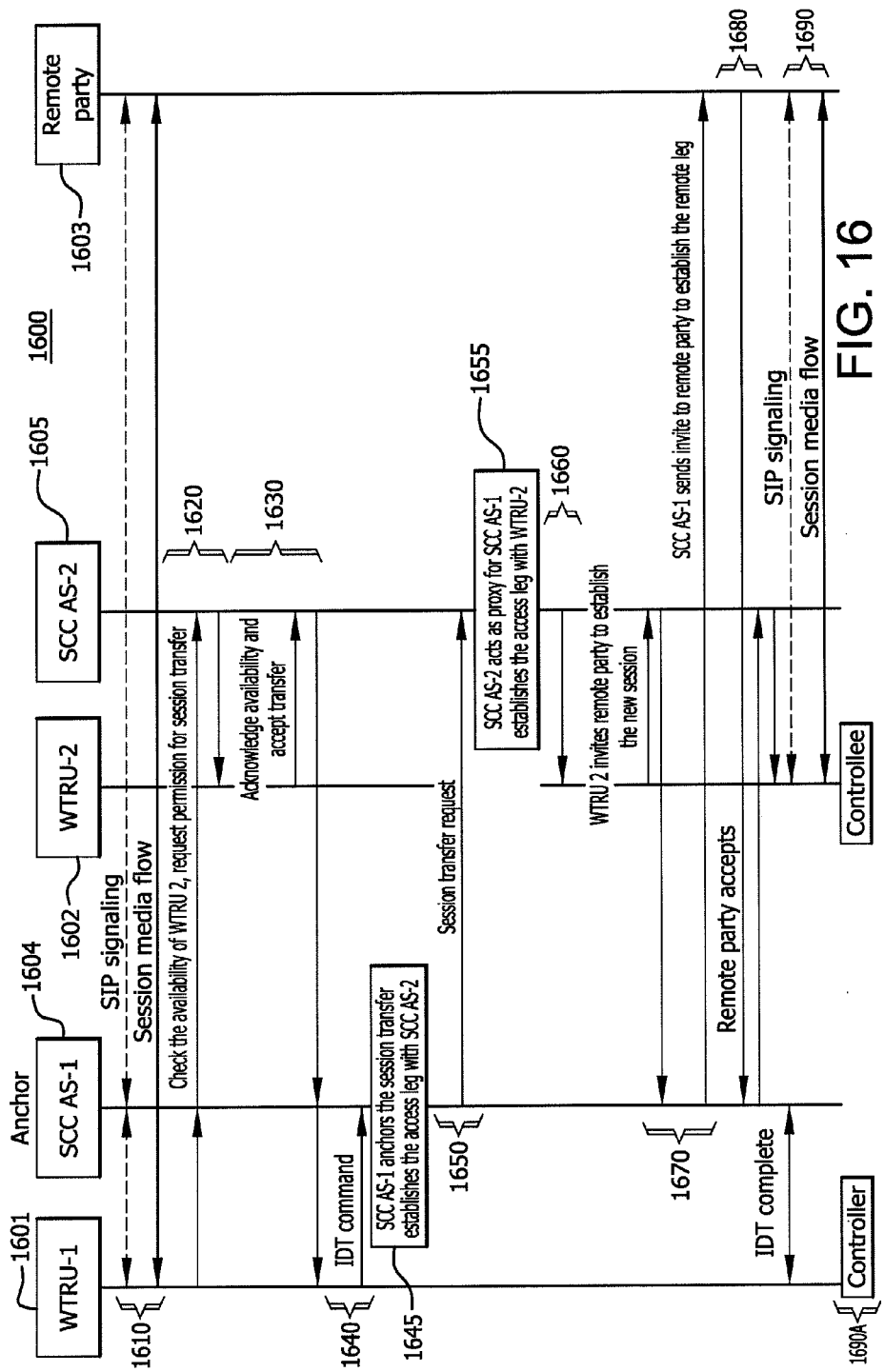
FIG. 16 shows an information flow for the transfer of a media session from a controller WTRU to a controllee WTRU.

FIG. 16 shows an embodiment 1600 of an information flow for the transfer of a media session from a controller WTRU, WTRU-1 1601, to a controllee WTRU, WTRU-2 1602, according to Inter Device Transfer (IDT) procedures. WTRU-1 1601 and WTRU-2 1602 may be connected via a network, such as the IP-CAN shown in FIG. 3. For simplicity, only the SCC AS-1 1604 and SCC AS-2 1605 are shown; however, the communication paths may include other elements of the IP-CAN, as shown in FIG. 2, and/or the RAN, as shown in FIG. 1. Although one media flow is shown, a collaborative session may include any number of communication sessions and media flows across any number of WTRUs. Furthermore, IDT may be used for the transfer of one or more media sessions.

Initially, WTRU-1 1601 has a media session flow with a remote party 1603 and control of the session is maintained between WTRU-1 1601 and SCC AS-1 1604 and the remote party 1603, where SIP signaling may be used for session control 1610. WTRU-1 1601 seeks to transfer a media session to controllee WTRU, WTRU-2 1602. Collaborative session control, however, may be kept with WTRU-1 1601. In this embodiment, WTRU-1 1601 and WTRU-2 1602 may be under different IMS subscriptions or the same IMS subscription. Furthermore, WTRU-1 1601 and WTRU-2 1602 may have the same operator or different operators.

IDT of a media session may be initiated by WTRU-1 1601 due to user input or because of a preconfiguration. WTRU-1 1601 may check the availability of WTRU-2 1602 to accept a transferred media flow or may request permission for media session transfer by sending a request to SCC AS-1 1604 1620. The request may include remote party identification (i.e. remote party 1603), session information such as the identity of the media flow to be transferred, the source of the media flow to be transferred (i.e. WTRU-1 1601) or the target of the media flow to be transferred (i.e. WTRU-2 1602), among other information. Further, the request may include a preference for a SCC AS to serve as an anchor for media session transfer. In this embodiment 1600, SCC AS-1 1604 anchors session transfer.

SCC AS-1 1604 may send the request to SCC AS-2 1605 1620, which serves WTRU-2 1602. SCC AS-2 1605 may, in turn, send the request to WTRU-2 1602 1620. WTRU-2 1602 may acknowledge its availability or accept the transfer of a one media flow or a subset of flows and accordingly notify SCC AS-2 1605 of its availability or acceptance 1630. SCC AS-2 1605 may send the acceptance to SCC AS-1 1604 which may, in turn, send the acceptance to WTRU-1 1601 1630. Furthermore, SCC AS-2 1605 may accept SCC AS 1 1604 to serve as the IDT anchor for media session transfer.

Then WTRU-1 1601 sends an IDT command to SCC AS-1 1604 requesting a transfer of a media flow to WTRU-2 1602 1640. The request may include remote party identification (i.e. remote party 1603), session information such as the identity of the media flow to be transferred, the source of the media flow to be transferred (i.e. WTRU-1 1601) or the target of the media flow to be transferred (WTRU-2 1602), among others. SCC AS-1 1604 as an anchor for session transfer may establish an access leg with SCC AS-2 1605 1645.

SCC AS-1 1604 may then send a request for session transfer to SCC AS-2 1605 1650. The request may include remote party identification (i.e. remote party 1603), session information such as the identity of the media flow to be transferred, the source of the media flow to be transferred (i.e. WTRU-1 1601), or the target of the media flow to be transferred (i.e. WTRU-2 1602). SCC AS-2 1605 may act as a proxy for SCC AS-1 1604 and may establish an access leg with WTRU-2 1602 1655. SCC AS-2 1605 may then send a request for media session transfer to WTRU-2 1602 1660.

WTRU-2 1602 may then invite the remote party 1603 to establish the transferred media session by sending an invitation to SCC AS-2 1605. The invitation may also request that new media be established with WTRU-2 1602. The invitation is sent by SCC AS-2 1605 to SCC AS-1 1604. SCC AS-1 1604 may then send the invitation to remote party 1603 to establish the media session with WTRU-2 1602 and a remote leg with SCC AS-1 1604 1670.

The remote party 1603 may, in turn, notify SCC AS-1 1604 of its acceptance of the session transfer 1680. Thereafter, SCC AS-1 1604 may notify WTRU-2 1602 of the remote party's acceptance via SCC AS-2 1605 1680. Further, SCC AS-1 1604 may notify WTRU-1 1601 of the completed transfer 1690. Subsequently, the media flow will run between WTRU-2 1602 and remote party 1603 1690. Furthermore, SIP signaling for media session control will run from WTRU-2 1602 to remote party 1603 1690. WTRU-1 1601 remains the controller WTRU and WTRU-2 1602 remains the controllee WTRU 1690A.

Figure 17:
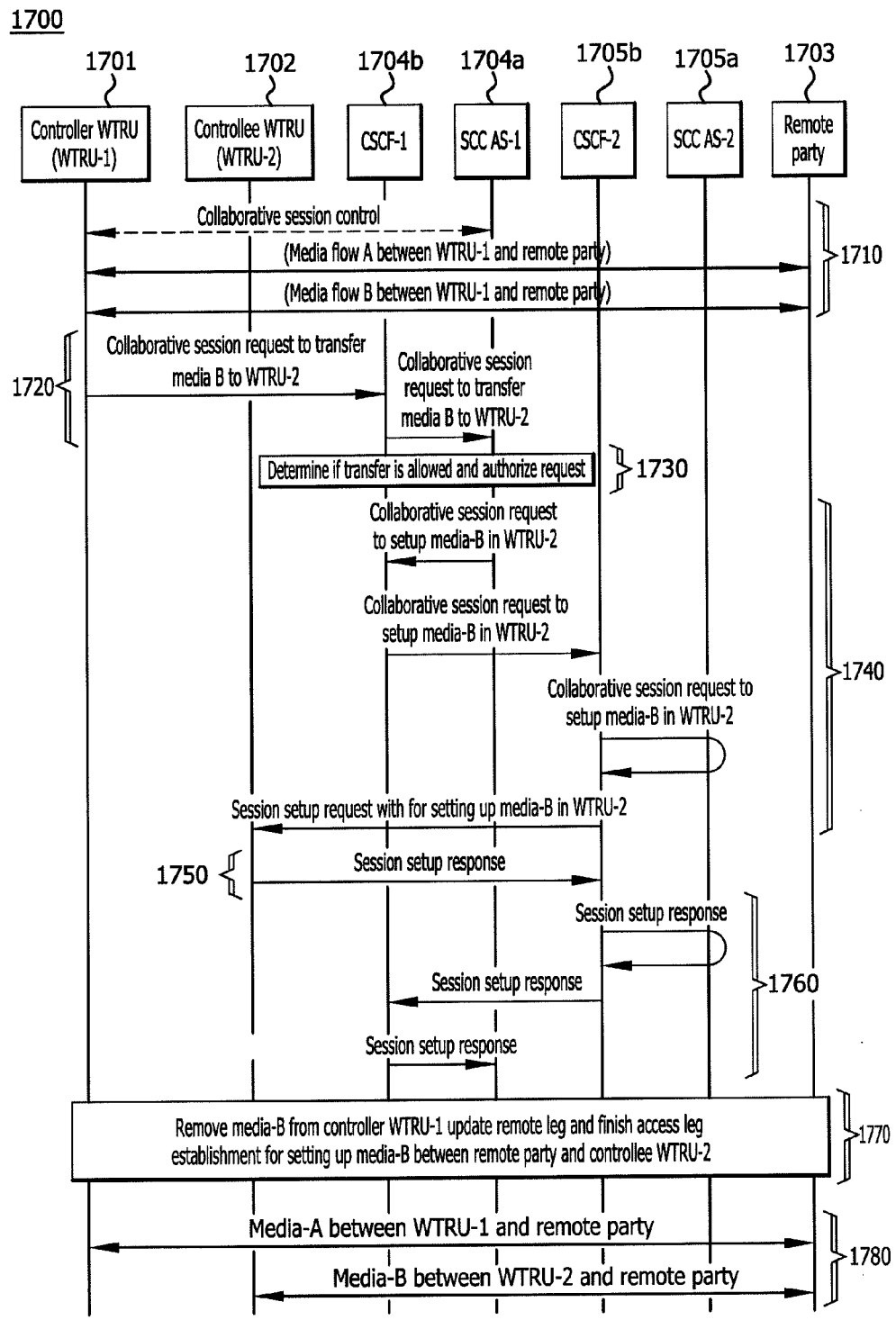
FIG. 17 shows an alternative embodiment of the information flow for the transfer of a media flow from a controller WTRU to a controllee WTRU.

FIG. 17 shows an alternative embodiment 1700 of the information flow for the transfer of a media flow from a controller WTRU to a controllee WTRU. CSCF-1 1704*b* and CSCF-2 1705*b* are both shown in FIG. 17 and the information flow shows the signaling paths through CSCF-1 1704*b* and CSCF-2 1705*b*. The WTRUs may belong to different IMS subscriptions and may be connected to the same operator or different operators. Initially, WTRU-1 1701 is in an IMS session of two media flows (media flow A and media flow B) with remote party 1703 1710. Being a controller WTRU, WTRU-1 1701 maintains control over the session 1710. The IMS session is anchored at SCC AS-1 1704*a* which provides coordination of collaborative session procedures. WTRU-1 1701 maintains control of the session by communicating with SCC AS-1 1704*a* via CSCF-1 1704*b*, where an access leg is established between SCC AS-1 1704*a* and CSCF 1704*b*.

WTRU-1 1701 desires to transfer media flow B to WTRU-2 1702, while keeping media flow A and control of the collaborative session. WTRU-1 1701 sends to CSCF-1 1704*b* a collaborative session request to transfer media flow B to WTRU-2 1702 1720. The request may include session information (i.e. the media flow to be transferred—media flow B), the target of the transferred media flow (i.e. WTRU-2 1702), or remote party ID, or the source of the media flow to be transferred (i.e. WTRU-1 1701). Then, CSCF 1704*b* sends the transfer request to SCC AS-1 1704*a* 1720. SCC AS-1 1704*a* may determine if the transfer is allowed and may authorize the request for transfer 1730. SCC AS-1 1704*a* sends a request to WTRU-2 1702 for setting up transferred media session B 1740. The request may include remote party identification (i.e. remote party 1703), session information such as the identity of the media flow to be transferred (i.e. media flow B), the source of the media flow to be transferred (i.e. WTRU-1 1701) or the target of the media flow to be transferred (i.e. WTRU-2 1702). CSCF-1 1704*b* then sends the request to CSCF-2 1705*b* 1740.

The request is routed via SCC AS-2 1705*a* which sends the request to WTRU-2 1702 1740. WTRU-2 1702, in turn, may accept the request for setting up media flow B and respond to SCC AS-2 1705*a* 1750. CSCF-2 1705*b* sends the response towards CSCF-1 1704*b* via SCC AS-2 1705*a* 1760. CSCF-1 1704*b* forwards the response to SCC AS-1 1704*a* 1760. SCC AS-1 may then remove media flow B from WTRU-1 1701, updates the remote leg and finalizes access leg establishment for setting up media flow B between WTRU-2 1702 and the remote party 1703 1770. After IDT, media B flows between WTRU-2 1702 and the remote party 1703, whereas media flow A flows between WTRU-1 1701 and the remote party 1703 1780.

Figure 18:
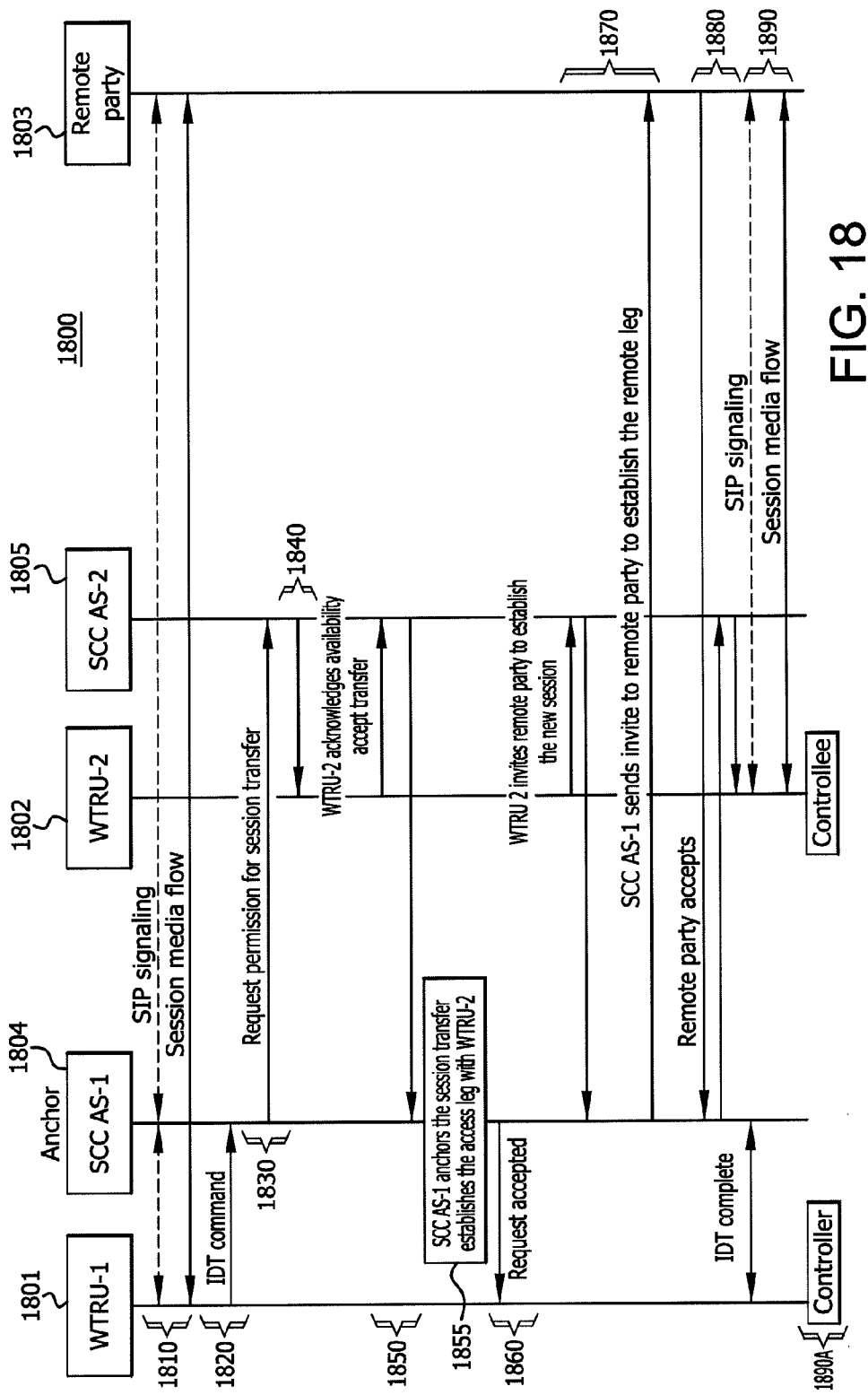
FIG. 18 shows an information flow for the transfer of a media session from a controller WTRU to a controllee WTRU.

FIG. 18 shows an alternative embodiment 1800 of an information flow for the transfer of a media session from a controller WTRU, WTRU-1 1801, to a controllee WTRU, WTRU-2 1802. The transfer is anchored at SCC AS-1 1804. In the embodiment, CSCF-1 and CSCF-2 belonging to WTRU-1 1801 and WTRU-2 1802, respectively, are not shown for simplicity. Initially, WTRU-1 1801 has a media session flow with a remote party 1803 and control of the session is maintained via SIP signaling between WTRU-1 1801 and SCC AS 1804 and the remote party 1803 1810. WTRU-1 1801 seeks to transfer the media session to controllee WTRU 1802 while collaborative session control is maintained with WTRU-1 1801. In the embodiment WTRU-1 1801 and WTRU-2 1802 may be under different IMS subscriptions. Furthermore, WTRU-1 1801 and WTRU-2 1802 may have different operators.

WTRU-1 1801 sends an IDT command to SCC AS-1 1804 to request a transfer of the media flow to WTRU-2 1802 1820. The request may include remote party identification (i.e., remote party 1803), session information such as the identity of the media flow to be transferred, the source of the media flow to be transferred (i.e., WTRU-1 1801) or the target of the media flow to be transferred (i.e., WTRU-2 1802), among other information.

SCC AS-1 1804 may check the availability of WTRU-2 1802 for receiving the transferred media session. SCC AS-1 1804 may send a request for session transfer to WTRU-2 1802 via SCC AS-2 1805 1830. The request may include remote party identification (i.e. remote party 1803), session information such as the identity of the media flow to be transferred, the source of the media flow to be transferred (i.e. WTRU-1 1801), the target of the media flow to be transferred (WTRU-2 1802), or anchor point preference (i.e. SCC AS-1 1804 or SCC AS-2 1805), among others. SCC AS-2 1805 may agree to SCC AS-1 1804 as an anchor and therefore act as a proxy for establishing an access leg with WTRU-2 1802.

SCC AS-2 1805 may send a request for media session transfer to WTRU-2 1802 1840. WTRU-2 1802 may acknowledge its availability or accept the transfer of the media flow by responding accordingly to SCC AS-2 1805 1850. SCC AS-2 1805 may send the acceptance or acknowledgement to SCC AS-1 1804 1850. SCC AS-1 1804 may anchor the session transfer and establish an access leg with WTRU-2 1802, where SCC AS-2 1805 acts as a proxy for the access leg 1855. Furthermore, SCC AS-1 1804 may notify WTRU-1 1801 of the acceptance of the media session transfer request 1850.

WTRU-2 1802 may then invite remote party 1803 to establish the new sessions by sending an invitation to SCC AS-2 1805, which may send the invitation to SCC AS-1 1804 1870. SCC AS-1 1804 may send the invitation to remote party 1803 1870. It may invite the remote party 1803 to establish a remote leg. Remote party 1803 may, in turn, accept the request and notify SCC AS-1 1804 which may notify WTRU-2 1802 via SCC AS-2 1805 1870. SCC AS-1 1804 may remove the media flow from WTRU-1 1801, update the remote leg and finalize access leg establishment for setting up the media flow with WTRU-2 1802.

Further, SCC AS-1 1804 may notify WTRU-1 1801 of the completed transfer 1890. Subsequently, the media flow will run between WTRU-2 1802 and remote party 1803 1890. Furthermore, SIP signaling for media session control will run from WTRU-2 1802 to remote party 1803 1890. WTRU-1 1801 remains the controller WTRU and WTRU-2 1802 remains the controllee WTRU 1890A.

Figure 19:
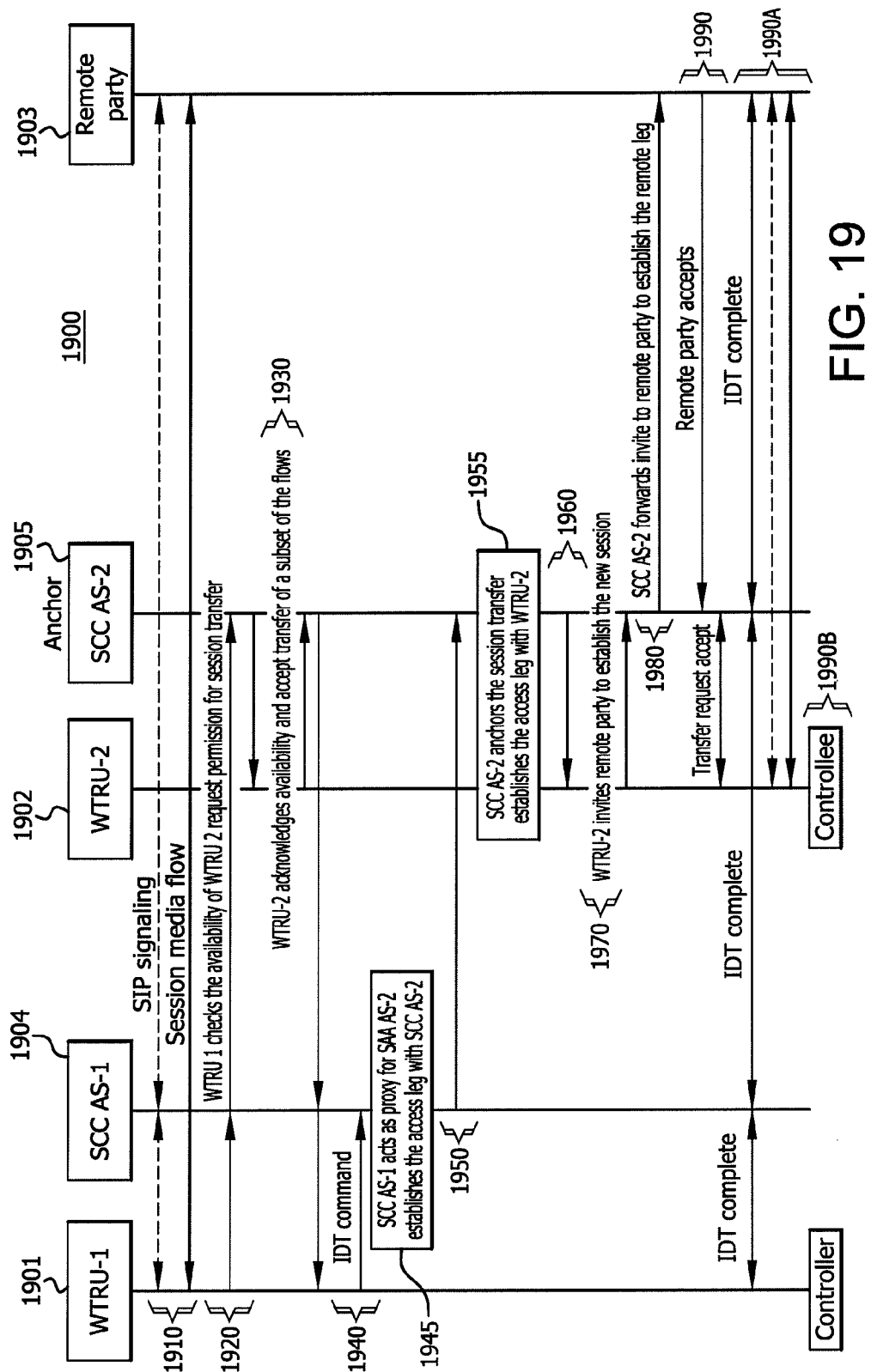
FIG. 19 shows an information flow for the transfer of a media session from a controller WTRU to a controllee WTRU.

FIG. 19 shows another embodiment 1900 of an information flow for IDT of a media session from a controller WTRU, WTRU-1 1901, to a controllee WTRU, WTRU-2 1902. The transfer is anchored in SCC AS-2 1905. In the embodiment, CSCF-1 and CSCF-2 belonging to WTRU-1 1901 and WTRU-2 1902, respectively, are not shown for simplicity.

Initially, WTRU-1 1901 has media session flow with a remote party 1903 and control of the session is maintained via SIP signaling between WTRU-1 1901 and SCC AS 1904*a* and the remote party 1903 1910. WTRU-1 1901 seeks to transfer a media session to WTRU. It is noted that although WTRU-1 1901 is a controller WTRU and WTRU-2 is a controllee WTRU, other controller WTRU and controllee WTRU arrangements are within the scope and spirit of the embodiment. For instance IDT may be initiated by a controllee WTRU or another WTRU that is not a part of the collaborative session.

WTRU-1 1901 sends a request to SCC AS-1 1904 to transfer the media flow to WTRU-2 1902 or check the availability of WTRU-2 1902 to accept the transferred session 1920. The request may include remote party identification (i.e. remote party 1903), session information such as the identity of the media flow to be transferred, the source of the media flow to be transferred (i.e. WTRU-1 1901) or the target of the media flow to be transferred (i.e., WTRU-2 1902) among other information. The request may be initiated by a preconfigured condition or may be the result of a user input. The request is sent to SCC AS-1 1904 and is then sent to WTRU-2 1902 via SCC AS-2 1905 1920.

SCC AS-2 1905 may negotiate to be the anchor of the IDT transfer. WTRU-2 1902 may acknowledge its availability or accept the transfer of the media flow. The acceptance is sent to SCC AS-2 1905 and goes to WTRU-1 1901 via SCC AS-1 1904 1930. WTRU-1 1901 may then send an IDT command to SCC AS-1 1904 to request transfer of the media session to WTRU-2 1902 1940. SCC AS-1 1904 may act as a proxy to SCC AS-2 1905 for session transfer and establish an access leg with SCC AS-2 1905 1945. The transfer request is sent to SCC AS-2 1905 by SCC AS-1 1904 1950. SCC AS-2 1905 may anchor IDT and establish an access leg with WTRU-2 1902 1955. SCC AS-2 1905 may send a session transfer request to WTRU-2 1902 1960.

WTRU-2 1902 may then invite remote party 1903 to establish a new session by sending an invitation to SCC AS-2 1905 1970. New media establishment may also be requested in the invitation. SCC AS-2 1905 may send the invitation to the remote party 1903 1980. SCC AS-2 1905 may also send an invitation to remote party to establish a remote leg with itself 1980. Remote party 1903 may, in turn, accept the request for transfer by notifying SCC AS-2 1905 and may include a new controller identification and identification of the media flow or flows transferred. SCC AS-2 1905 may notify WTRU-2 1902 of the accepted transfer 1990.

SCC AS-2 1905 may remove the media session from WTRU-1 1901 and update the remote leg and finish access leg establishment for setting up the media session between the remote party 1903 and WTRU-2 1902. IDT is, therefore, complete and SCC AS-2 1905 may signal to the remote party an indication of the completion of IDT 1990A. Furthermore, signaling of the completion of IDT may be communicated between WTRU-1 1901 and SCC AS-1 1904, and between SCC AS-2 1905 and SCC AS-1 1904 1990A. The media session runs between WTRU-2 1902 and the remote party 1903 and control of the media session also runs between WTRU-2 1902 and the remote party 1903 1990A. However, collaborative session control may remain with WTRU-1 1901, where WTRU-2 1902 will be a controllee WTRU 1990B.

Figure 20:
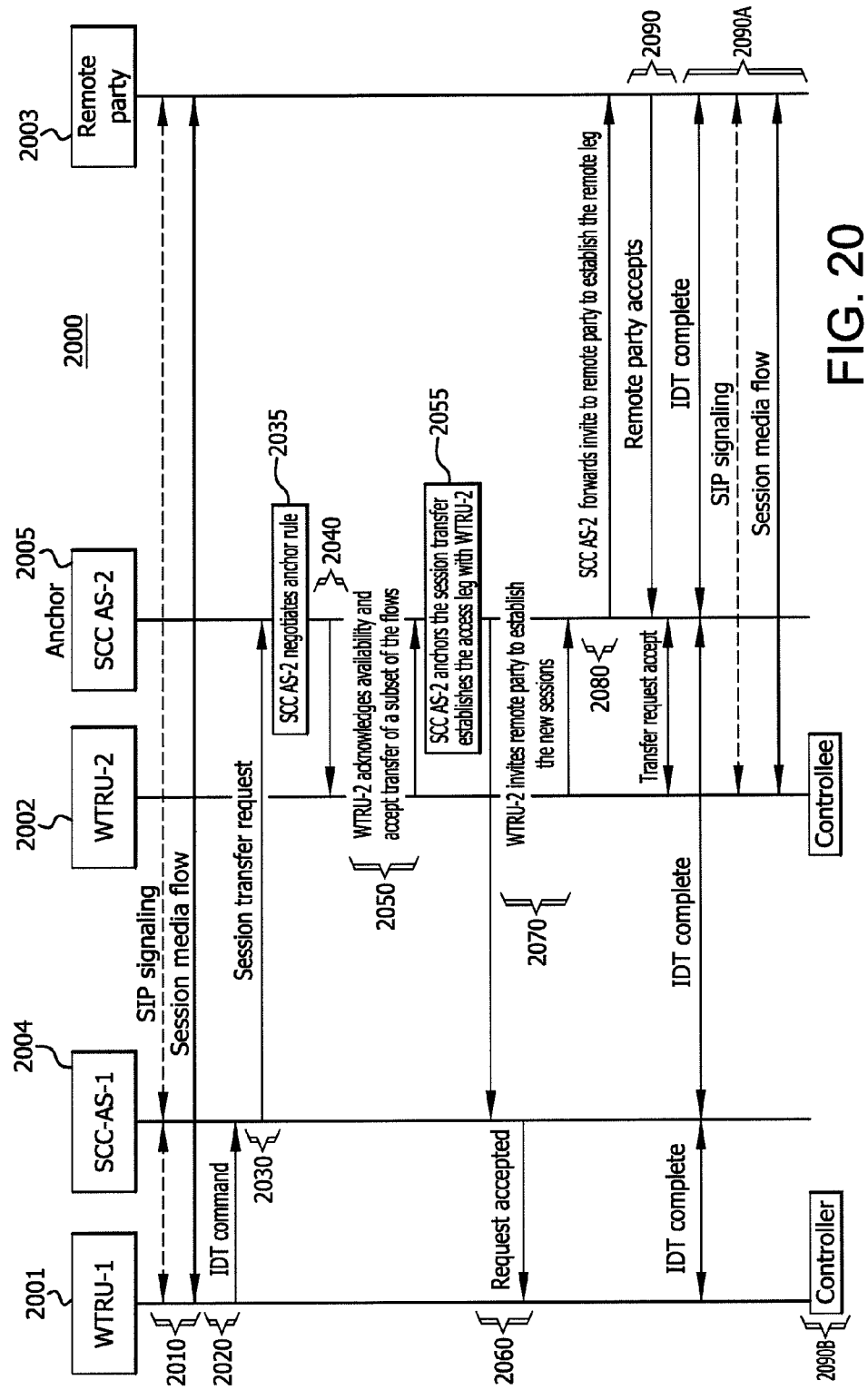
FIG. 20 shows an information flow for the transfer of a media session from a controller WTRU to a controllee WTRU.

FIG. 20 shows another embodiment 2000 of an information flow for the transfer of a media session from a controller WTRU, WTRU-1 2001, to a controllee WTRU, WTRU-2 2002. In the embodiment, CSCF-1 and CSCF-2 belonging to WTRU-1 2001 and WTRU-2 2002, respectively, are not shown for simplicity. Initially, WTRU-1 2001 has media session flow with a remote party 2003 and control of the session is maintained via SIP signaling between WTRU-1 2001 and SCC AS-1 2004 and the remote party 2003 2010. WTRU-1 2001 seeks to transfer media session to controllee WTRU 2002 while keeping session control with WTRU-1 2001. WTRU-1 2001 and WTRU-2 2002 may be under different IMS subscriptions or the same IMS subscription. Furthermore, WTRU-1 2001 and WTRU-2 2002 may have the same operator or different operators.

WTRU-1 2001 sends an IDT command to request a transfer of the media session to WTRU-2 2002 2020. The request is sent to SCC AS-1 2004, which may check the availability of WTRU-2 2002 for receiving the transferred media session.

SCC AS-1 2004 may send a request for session transfer to SCC AS-2 2005 2030. The request may include remote party identification (i.e. remote party 2003), session information such as the identity of the media flow to be transferred, the source of the media flow to be transferred (i.e., WTRU-1 2001), the target of the media flow to be transferred (i.e., WTRU-2 2002), or anchor point preference (i.e. SCC AS-1 2004 or SCC AS-2 2005), among other information. SCC AS-2 2005 may negotiate as to whether SCC AS-1 2004 or itself may anchor session transfer 2035. In this embodiment, SCC AS-2 2005 anchors session transfer. SCC AS-2 2005 may send a request for media session transfer to WTRU-2 2002 2040. SCC AS-2 2005 may request WTRU-2 2002 to acknowledge whether it is available or whether it is able to accept session transfer request 2040.

WTRU-2 2002 may acknowledge its availability or accept the transfer of the media flow by responding to SCC AS-2 2005 2050. SCC AS-2 2005 may anchor session transfer and may establish an access leg with WTRU-2 2002 2055. SCC AS-2 2005 may send the acceptance or acknowledgement to SCC AS-1 2004 2060. SCC AS-1 2004 may then notify WTRU-1 2001 of the acceptance or acknowledgement of the media session transfer request 2060.

WTRU-2 2002 may then invite remote party 2003 to establish the new session by sending an invitation to SCC AS-2 2005 2070. New media establishment may also be requested in the invitation. SCC AS-2 2005 may send the invitation to the remote party 2003 2080. SCC AS-2 2005 may also send an invitation to remote party to establish a remote leg with itself 2080. Remote party 2003 may, in turn, accept the request for transfer by notifying SCC AS-2 2005 and may include a new controller identification and identification of the media flow or flows transferred. SCC AS-2 2005 may notify WTRU-2 2002 of the accepted transfer 2090.

SCC AS-2 2005 may remove the media flow from WTRU-1 2001, update the remote leg with the remote party 2003 and finish access leg establishment for setting up media session between the remote party 2003 and WTRU-2 2002. Further, SCC AS-2 2005 may notify SCC AS-1 2004 and the remote party 2003 of the completed transfer 2090A. Further, SCC AS-1 2004 may notify WTRU-1 2001 of the completed transfer 2090A. Subsequently, the media flow will run between WTRU-2 2002 and remote party 2003 2090A. Furthermore, SIP signaling for controlling the media flow will run from WTRU-2 2002 to the remote party 2003 2090A. However, collaborative session control may remain with the controller WTRU, WTRU-1 2001, where WTRU-2 2001 may be a controllee WTRU 2090B.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented by an Internet Protocol (IP) multimedia subsystem (IMS) network node, the method comprising:
   the IMS network node receiving a first collaborative session control signaling from a first wireless transmit/receive unit (WTRU) for an existing IMS collaborative session between at least the first WTRU and a second WTRU, wherein the first WTRU is the initial controller of the existing IMS collaborative session;
   the IMS network node detecting that the first collaborative session control signaling from the first WTRU is degraded; and
   the IMS network node initiating, based on the IMS network node detecting that the first collaborative session control signaling is degraded, a transfer of control of the existing IMS collaborative session from the first WTRU to the second WTRU at least in part by:
      transmitting an IMS-network-node-initiated collaborative session control transfer request to the second WTRU, wherein the IMS-network-node-initiated collaborative session control transfer request is governed by a collaborative session control preference and indicates a request for the second WTRU to receive control of the existing IMS collaborative session;
      receiving a response from the second WTRU, wherein the response indicates acceptance of the IMS-network-node-initiated collaborative session control transfer request; and
      receiving a second collaborative session control signaling for the existing IMS collaborative session from the second WTRU, which signaling includes an identification of the second WTRU as the new controller of the existing IMS collaborative session,
   the existing IMS collaborative session being maintained, at least in part, through the IMS network node both before and after the second WTRU becomes the new controller.

2. The method of claim 1, wherein the second WTRU has an IMS media flow with a remote party.

3. The method of claim 1, wherein the IMS-network-node-initiated collaborative session control transfer request and the response are Session Initiation Protocol (SIP) messages.

4. The method of claim 1, further comprising:
   transferring collaborative session control to the second WTRU.

5. The method of claim 1, wherein the IMS-network-node-initiated collaborative session control transfer request includes one or more of an identity of the IMS collaborative session, an identity of a media flow of the IMS collaborative session, an identity of the first WTRU, or an identity of the second WTRU.

6. An Internet Protocol (IP) multimedia subsystem (IMS) network node comprising:
   circuitry configured to receive a first collaborative session control signaling from a first wireless transmit/receive unit (WTRU) for an existing IMS collaborative session between at least the first WTRU and a second WTRU, wherein the first WTRU is the initial controller of the existing IMS collaborative session;

circuitry configured to detect that the first collaborative session control signaling from the first WTRU is degraded; and circuitry configured to initiate, on a condition that the first collaborative session control signaling is degraded, a transfer of control of the existing IMS collaborative session from the first WTRU to the second WTRU at least in part by:

transmitting an IMS-network-node-initiated collaborative session control transfer request to the second WTRU, wherein the IMS-network-node-initiated collaborative session control transfer request is governed by a collaborative session control preference and indicates a request for the second WTRU to receive control of the existing IMS collaborative session, the request including an identification of the second WTRU as the new controller;

receiving a response from the second WTRU, wherein the response indicates acceptance of the IMS-network-node-initiated collaborative session control transfer request; and receiving a second collaborative session control signaling for the existing IMS collaborative session from the second WTRU, the second collaborative session control signaling being indicative of the second WTRU as the new controller, the existing IMS collaborative session being maintained, at least in part, through the IMS network node both before and after the second WTRU becomes the new controller.

7. The IMS network node of claim 6, wherein the second WTRU has an IMS media flow with a remote party and wherein the collaborative session control transfer request and the response are Session Initiation Protocol (SIP) messages.

8. The IMS network node of claim 6, further comprising:

circuitry configured to transfer collaborative session control to the second WTRU, wherein the collaborative session control transfer request includes one or more of an identity of the IMS collaborative session, an identity of a media flow of the IMS collaborative session, an identity of the first WTRU, or an identity of the second WTRU.

* * * * *